US011162878B2

(12) United States Patent
Barnett et al.

(10) Patent No.: US 11,162,878 B2
(45) Date of Patent: Nov. 2, 2021

(54) SPECIMEN PROCESSING SYSTEMS, PIPETTE ASSEMBLIES AND METHODS FOR PREPARING REAGENTS

(71) Applicant: Ventana Medical Systems, Inc., Tucson, AZ (US)

(72) Inventors: Donald M. Barnett, Tucson, AZ (US); Robert Javier Cisneroz, Tucson, AZ (US); Timothy Brett McDonald, Hawthorn (AU); Christopher OHaire, Keilor East (AU); Jason Ruhl, Tucson, AZ (US); John Charles Tessen, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 43 days.

(21) Appl. No.: 15/385,870

(22) Filed: Dec. 21, 2016

(65) Prior Publication Data
US 2017/0097289 A1 Apr. 6, 2017

Related U.S. Application Data

(63) Continuation of application No. PCT/EP2015/064520, filed on Jun. 26, 2015.
(Continued)

(51) Int. Cl.
*G01N 1/31* (2006.01)
*G01N 35/00* (2006.01)
(Continued)

(52) U.S. Cl.
CPC ....... *G01N 1/312* (2013.01); *G01N 35/00029* (2013.01); *G01N 35/1011* (2013.01); *B01L 3/0293* (2013.01); *G01N 2035/0443* (2013.01)

(58) Field of Classification Search
USPC .......................................... 73/864.01–864.25
See application file for complete search history.

(56) References Cited

U.S. PATENT DOCUMENTS

| 4,050,316 A | * | 9/1977 | Rapoza ................... B01L 3/022 |
| | | | 73/864.14 |
| 4,811,611 A | * | 3/1989 | Uffenheimer ...... G01N 35/1004 |
| | | | 73/864.22 |

(Continued)

FOREIGN PATENT DOCUMENTS

| EP | 1739433 B1 | 8/2013 |
| WO | 9510035 A2 | 4/1995 |
| WO | 9943434 A1 | 9/1999 |

OTHER PUBLICATIONS

International Search Report and Written Opinion dated Sep. 16, 2015 in corresponding PCT/EP2015/064520, 13 pages.

*Primary Examiner* — Nathaniel J Kolb
(74) *Attorney, Agent, or Firm* — Perkins Coie LLP

(57) ABSTRACT

Systems and methods that enable automated processing of specimens carried on microscope slides are described herein. Aspects of the technology are directed, for example, to automated slide processing apparatuses capable of dispensing liquids onto microscope slides. Additional aspects of the technology are directed to methods of replacing a reagent pipette in automated slide processing apparatuses. The apparatus can include, for example, a reagent pipette assembly including a reagent pipette moveable between at least one loading position for obtaining reagent from a reagent container at a filling station and at least one dispense position. The apparatus can also include a retainer for releasably securing the reagent pipette. In some embodiments, the reagent pipette assembly includes a locking mechanism for transitioning the retainer from an open configuration for receiving a pipette and a closed configuration for securing a pipette, in e.g., an aligned position within the retainer.

22 Claims, 16 Drawing Sheets

Related U.S. Application Data

(60) Provisional application No. 62/019,058, filed on Jun. 30, 2014.

(51) Int. Cl.
  *G01N 35/10* (2006.01)
  *G01N 35/04* (2006.01)
  *B01L 3/02* (2006.01)

(56) References Cited

U.S. PATENT DOCUMENTS

| | | | |
|---|---|---|---|
| 5,200,151 A * | 4/1993 | Long | B01L 3/0275 422/511 |
| 6,143,250 A | 11/2000 | Tajima | |
| 2003/0203493 A1 * | 10/2003 | Lemme | G01N 1/312 422/64 |
| 2008/0286157 A1 | 11/2008 | Mathus et al. | |
| 2009/0266149 A1 * | 10/2009 | Kaplit | G01N 35/1016 73/54.09 |
| 2010/0266454 A1 * | 10/2010 | Reichmuth | B01L 3/0279 422/501 |
| 2011/0000276 A1 * | 1/2011 | Wassermeier | G01N 29/30 73/1.74 |
| 2011/0072915 A1 * | 3/2011 | Molitor | B01L 3/0237 73/864.11 |
| 2013/0205922 A1 * | 8/2013 | Leventhal | B01L 3/18 73/864.01 |
| 2013/0255404 A1 * | 10/2013 | Mohr | B01L 3/0217 73/864.01 |
| 2013/0280143 A1 * | 10/2013 | Zucchelli | G01N 35/0099 422/501 |
| 2014/0234949 A1 * | 8/2014 | Wasson | G01N 35/00871 435/287.2 |

* cited by examiner

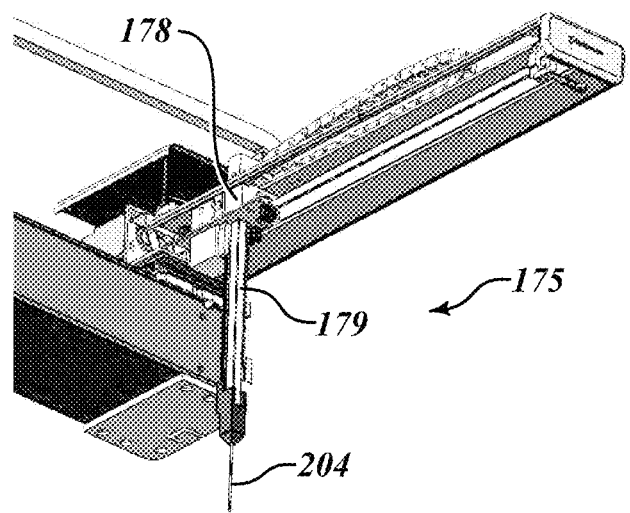
FIG. 9E
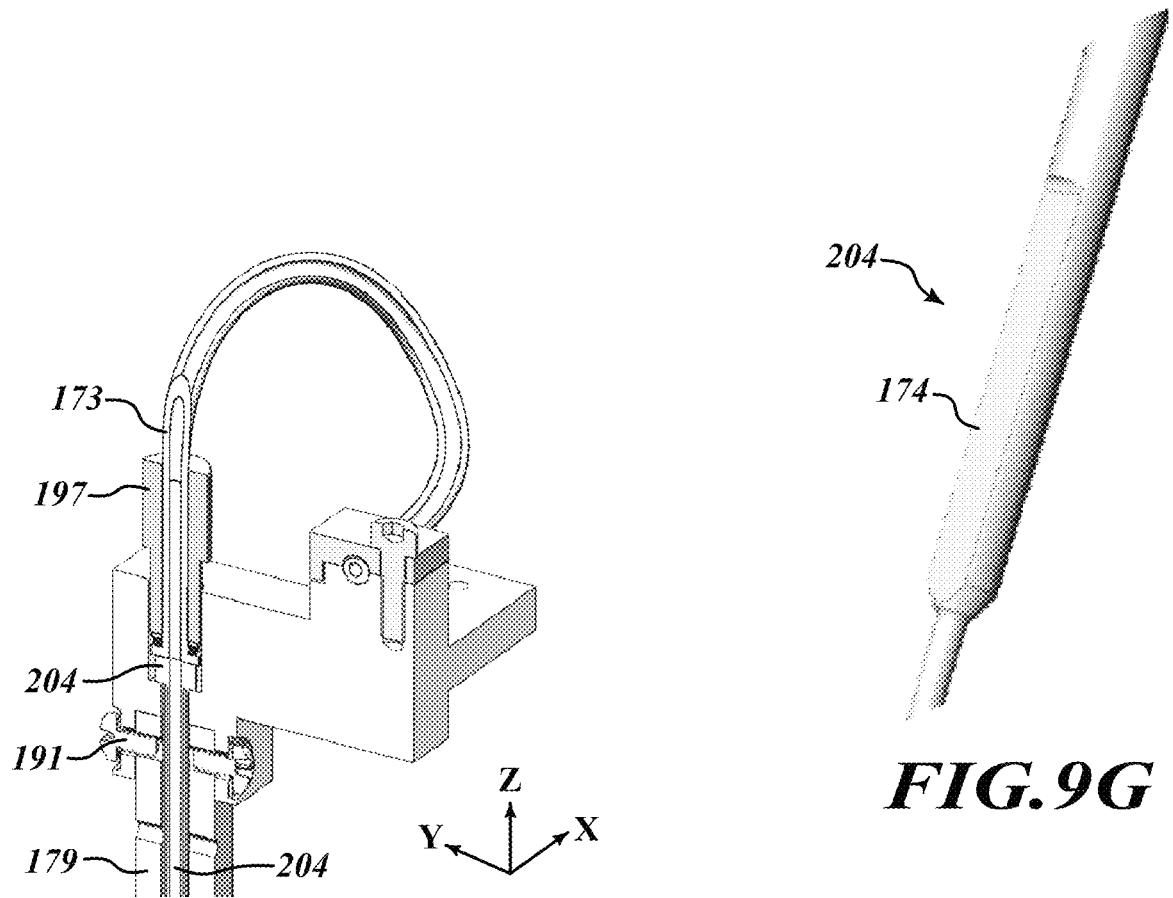
FIG. 9F
FIG. 9G

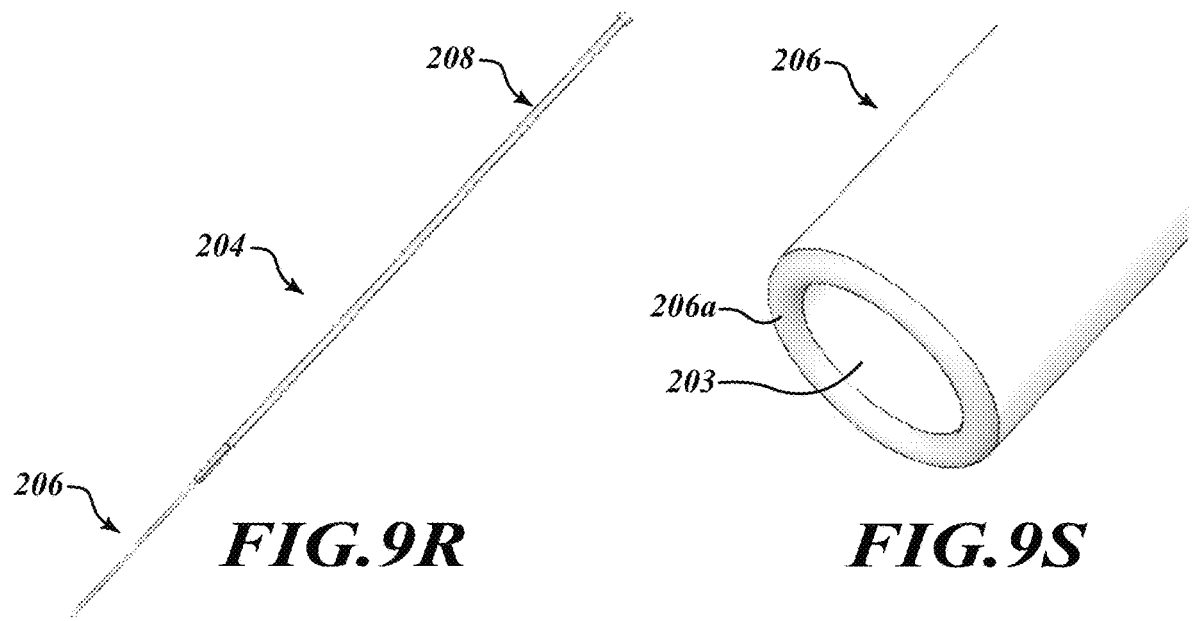
FIG.9R　　FIG.9S
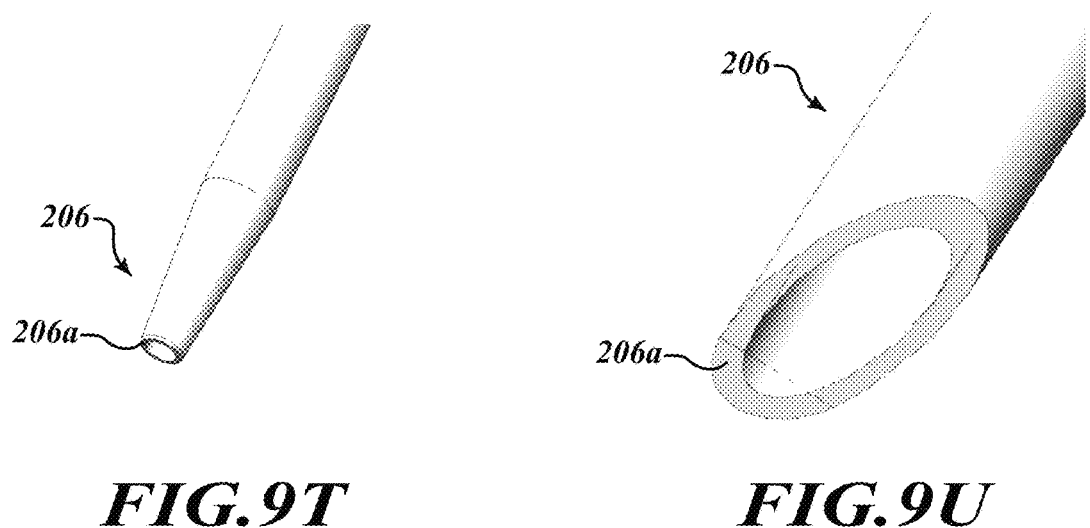
FIG.9T　　FIG.9U

SPECIMEN PROCESSING SYSTEMS, PIPETTE ASSEMBLIES AND METHODS FOR PREPARING REAGENTS

CROSS-REFERENCE TO RELATED APPLICATIONS

This patent application is a continuation of International Patent Application No. PCT/EP2015/064520 filed Jun. 26, 2015, which claims priority to and the benefit of U.S. Provisional Application No. 62/019,058, filed Jun. 30, 2014. Each of the above patent applications is incorporated herein by reference as if set forth in its entirety.

TECHNICAL FIELD

This disclosure relates to systems for preparing specimens for analysis. In particular, the disclosure relates to specimen processing systems, pipette assemblies, and methods of processing specimens.

BACKGROUND

A wide variety of techniques have been developed to prepare and analyze biological specimens. Example techniques include microscopy, microarray analyses (e.g., protein and nucleic acid microarray analyses), and mass spectrometric methods. Specimens are prepared for analysis by applying one or more liquids to the specimens. If a specimen is treated with multiple liquids, both the application and the subsequent removal of each of the liquids can be important for producing samples suitable for analysis.

Microscope slides bearing biological specimens, e.g., tissue sections or cells, are often treated with one or more dyes or reagents to add color and contrast to otherwise transparent or invisible cells or cell components. Specimens can be prepared for analysis by manually applying dyes or other reagents to specimen-bearing slides. This labor-intensive process often results in inconsistent processing due to individual techniques among laboratory technicians.

"Dip and dunk" automated machines immerse specimens in liquids by a technique similar to manual immersing techniques. These automated machines can process specimens in batches by submerging racks carrying microscope slides in open baths. Unfortunately, carryover of liquids between containers leads to contamination and degradation of the processing liquids. Worse, cells sloughing off the specimen carrying slides can cause contamination of other slides in the liquid baths. These types of processes also utilize excessive volumes of liquids, resulting in relatively high processing costs when the reagents must be changed to reduce the possibility of specimen cross-contamination. Open containers are also prone to evaporative losses and reagent oxidative degradation that may significantly alter the concentration and effectiveness of the reagents, resulting in inconsistent processing. It may be difficult to process samples without producing significant volumes of waste that may require special handling and disposal.

Immunohistochemical and in situ hybridization staining processes are often used to prepare tissue specimens. The rate of immunohistochemical and in situ hybridization staining of sectioned fixed tissue on a microscope slide is limited by the speed at which molecules (e.g., conjugating biomolecules) can diffuse into the fixed tissue from an aqueous solution placed in direct contact with the tissue section. Tissue is often "fixed" immediately after excision by placing it in a 10% solution of formaldehyde, which preserves the tissue from autocatalytic destruction by cross-linking much of the protein via methylene bridges. This cross-linked tissue may present many additional barriers to diffusion, including the lipid bilayer membranes that enclose individual cells and organelles. Conjugate biomolecules (antibody or DNA probe molecules) can be relatively large, ranging in size from a few kilodaltons to several hundred kilodaltons, which constrains them to diffuse slowly into solid tissue with typical times for sufficient diffusion being in the range of several minutes to a few hours. Typical incubation conditions are 30 minutes at 37 degrees centigrade. The stain rate is often driven by a concentration gradient so the stain rate can be increased by increasing the concentration of the conjugate in the reagent to compensate for slow diffusion. Unfortunately, conjugates are often very expensive, so increasing their concentration is wasteful and often not economically viable. Additionally, the excessive amount of conjugate that is driven into the tissue, when high concentrations are used, is entrapped in the tissue, is difficult to rinse out, and causes high levels of non-specific background staining. In order to reduce the noise due to non-specific background staining and increase the signal of specific staining, low concentrations of conjugate with long incubation times are often used to allow the conjugate to bind only to the specific sites.

Histology staining instruments often use relatively large volumes of reagent (100 μL) in a puddle of typically 300 μL of buffer. Some conventional instruments mix the reagent by alternating tangential air jets onto an overlaying oil layer that rotates and counter-rotates when contacted by the alternating air jets, thereby imparting motion into the underlying aqueous puddle. This mixing is slow and not particularly vigorous, and it can create significant evaporation losses, especially at the elevated temperatures that are often necessary. Large volumes of rinse liquid are used to physically displace the large puddles of reagents, which are covered with oil. This rinsing procedure produces large volumes of waste liquid, which may be hazardous waste.

Overview of Technology

Some embodiments of the technology are directed to an automated slide processing apparatus for dispensing liquids onto one or more microscope slides. The automated slide processing apparatus can comprise, in one embodiment, a carousel that includes a plurality of reservoir wells and a reagent pipette assembly that includes a reagent pipette movable between at least one loading position for obtaining reagent from one of the reservoir wells and at least one dispense position for dispensing reagent onto one of the microscope slides. In some arrangements, the automated slide processing apparatus can also include a wash pipette assembly configured to wash the plurality of reservoir wells and a drive mechanism coupled to the carousel and configured to rotate the carousel to position the reservoir wells relative to the reagent pipette assembly and/or the wash pipette assembly.

At least some of the embodiments of the automated slide processing apparatus can include a filling station including a plurality of containers holding reagents and a plurality of slide processing stations. The reagent pipette assembly, for example, can be movable through an internal chamber of the automated slide processing apparatus to transport reagents obtained at the filling station to the carousel and to dispense reagent mixtures from the carousel onto one of the microscope slides. In another embodiment, the reagent pipette assembly is movable between a filling position for obtaining reagent from the containers at the filling station and a dispensing position for filling one or more of the reservoir wells with reagent from the filling station. In some embodiments, the automated slide processing apparatus has a mixing mode in which the reagent pipette assembly mixes reagents within one or more of the reservoir wells and dispenses the reagent mixtures onto the microscope slides.

The drive mechanism, for example, can be configured to sequentially rotate the reservoir wells underneath a wash pipette of the wash pipette assembly and/or the reagent pipette of the reagent pipette assembly. In one embodiment, the reagent pipette assembly has a reagent load state for obtaining reagent from the reservoir wells while the wash pipette assembly, for example, delivers wash liquid to another one of the reagent wells. In some embodiments, the wash pipette assembly includes a pipette movable into each of the reservoir wells. In a further embodiment, the wash pipette assembly is fluidically coupled to a vacuum source, and the wash pipette assembly draws liquid from one of the reservoir wells when the vacuum source draws a vacuum. In some embodiments, the reagent pipette assembly accesses the reservoir well at the same location, and the carousel can rotate the reservoir wells to the location accessible by the reagent pipette assembly. In other embodiments, the carousel rotates to position reagent wells such that the reagent pipette assembly accesses reservoir wells at different locations.

In some embodiments, the carrousel has dedicated waste pathways to direct liquid into a drain without risk of contamination to other adjacent wells. In at least some embodiments of the technology, the carousel includes spillways configured to allow fluid (e.g., cleaning liquid, reagent, etc.) to flow from the reservoirs wells to prevent cross-contamination (e.g., flow of fluid between adjacent reservoir wells). The spillways can have the same radial length to inhibit or prevent recirculation of the waste stream into an adjacent well. In one embodiment, the carousel can include a plurality of overflow partitions that are individually positioned circumferentially between adjacent reservoir wells. In one example, the overflow partitions extend upwardly and radially inward from the reservoir wells. The carousel, in further embodiments, can include a drain and the spillways that allow an overflow of reagent to flow from the reservoir wells toward the drain.

In one embodiment, the automated slide processing apparatus includes a controller communicatively coupled to the drive mechanism and configured to command the drive mechanism such that the drive mechanism sequentially moves each of the reservoir wells to a washing position for washing by the wash pipette assembly. The controller, in some embodiments, stores and executes instructions for commanding the reagent pipette to sequentially fill the reservoir wells with reagent from reagent containers. In another embodiment, the automated slide processing apparatus includes a controller having mixing instructions that are executable to command the reagent pipette assembly such that the reagent pipette assembly delivers at least two reagents to one or more of the reservoir wells to produce a reagent mixture. In one arrangement of such an embodiment, the controller has mixed reagent dispense instructions that are executable to command the reagent pipette assembly to dispense reagent mixtures onto specimens.

Further embodiments of the technology are directed to methods of sequentially delivering reagents to a plurality of reservoir wells of a carousel to produce reagent mixtures. The carousel can be rotatable to sequentially position the reservoir wells at one or more wash positions. The method can also include at least partially filling a reagent pipette with the reagent mixture from one of the reservoir wells while at least one of the reservoir wells is located at the wash position(s). The reagent pipette assembly can partially aspirate multiple reagents from either one of the reservoir wells (pre-mixed) or multiple wells for a single or multiple shot dispense onto one or more slides. After at least partially filling the reagent pipette with reagent, the method can further include robotically moving the reagent pipette toward the microscope slide and dispensing the reagent onto the microscope slide. In yet further embodiments, the method can include rotating the carousel such that one of the reservoir wells containing reagent (e.g., excess or residual reagent) is located at the wash position, and washing the reservoir well at the wash position to remove the reagent.

In other arrangements, the automated slide processing apparatus can include, in one embodiment, a reagent pipette assembly having a reagent pipette moveable between at least one loading position for obtaining reagent from a reagent container at a filling station and at least one dispense position. The reagent pipette assembly can also include a retainer for releasably securing the reagent pipette. In some embodiments, the reagent pipette assembly includes a locking mechanism for transitioning the retainer from an open configuration for receiving a pipette to a closed configuration for securing a pipette in, e.g., an aligned position within the retainer.

Some of the embodiments of the present technology are directed to methods of replacing a pipette in an automated slide processing apparatus. For example, a method can include releasing a locking mechanism on a carriage assembly of a reagent pipette assembly to release a first pipette from a pipette retainer. The method can also include removing the first pipette from a shaft of the pipette retainer and sliding a second pipette into the shaft of the pipette retainer. The method can further include engaging the locking mechanism on the carriage assembly to retain the second pipette in the shaft of the pipette retainer. In one embodiment, the locking mechanism can include a central lever, and wherein releasing the locking mechanism includes lifting the central lever, and wherein engaging the locking mechanism includes lowering the central lever.

At least some embodiments of the technology are directed to biological specimen processing systems capable of processing specimens carried on slides. The specimen processing systems can sequentially deliver slides and opposables to specimen processing stations. The specimen processing stations can use opposables to manipulate and direct a series of liquids to the specimens. The liquids can be manipulated over and/or across the slide surfaces in conjunction with capillary action while the specimen processing stations control the processing temperatures for histology staining, immunohistochemical staining, in situ hybridization staining, or other specimen processing protocols. In some embodiments, the opposables are surfaces or opposable elements capable of manipulating one or more substances on a slide. Manipulating a substance in the form of a fluid can include spreading the fluid, displacing a thin film of fluid, or otherwise altering a bolus of fluid, a band of fluid, or a thin film.

At least some embodiments of the technology are directed to a system that contacts a biological specimen with a liquid by moving an opposable in contact with the liquid. A distance separating a non-planar (e.g., curved), wetted surface of the opposable and a slide carrying the specimen is sufficient to form a liquid meniscus layer between the wetted surface and the slide. The meniscus layer contacts at least a portion of the biological specimen and is moved across the slide using capillary and other manipulative action.

The meniscus layer, in some embodiments, can be a relatively thin fluid film, a band of fluid, or the like. The opposable is movable to different positions relative to the slide and can accommodate different volumes of liquid forming the meniscus layer. The capillary action can include, without limitation, movement of the meniscus layer due to the phenomenon of the liquid spontaneously creeping through the gap between the curved, wetted opposable surface and the slide due to adhesive forces, cohesive forces, and/or surface tension. The opposable can manipulate (e.g., agitate, displace, etc.) the liquid to process the specimen using relatively small volumes of a liquid to help manage waste and provide consistent processing. Evaporative losses, if any, can be managed to maintain a desired volume of liquid, reagent concentration, or the like. Relatively low volumes of liquids can be used to process the specimens for a reduced liquid waste.

In some embodiments, a system includes one or more automated slide holders that can heat individual slides via conduction to produce temperature profiles across slides that compensate for heat losses. The heat losses can be caused by evaporation of liquid in a gap between a slide and an opposable disposed proximate to the slide. In one embodiment, the slide holder has a slide support surface and produces a non-uniform temperature profile along the slide support surface contacting the slide such that a specimen-bearing surface of the slide has a substantially uniform temperature profile when the slide is located on the slide support surface. In some embodiments, a non-uniform temperature profile is produced across the slide support surface while a substantially uniform temperature profile is produced along the mounting surface of the slide. Another feature of at least some embodiments of the present technology is that the slide holder can be configured to produce a low temperature heating zone and a high temperature heating zone surrounding the low temperature heating zone. The high temperature zone can compensate for relative high evaporative heat losses to keep the specimen at a generally uniform temperature.

The slide processing apparatus, in some embodiments, includes a dispenser positioned to deliver a supplemental liquid between the opposable element and the slide while a liquid is held in the gap there between. Additionally, the slide processing apparatus can include a controller communicatively coupled to the dispenser and programmed to command the dispenser such that the dispenser delivers the supplemental liquid to keep a volume of liquid between the opposable element and the slide within an equilibrium volume range. In some embodiments, the controller is programmed to deliver supplemental liquid at a predetermined rate. In one embodiment, the predetermined rate is equal to or less than about 110 µL per minute at a temperature of about 95° C. for bulk liquids. In some embodiments, the predetermined rate is equal to or less than about 7 µL per minute at a temperature of about 37° C. for non-bulk reagents. The rate can be selected based on the specimen staining protocol being processed.

The slide processing apparatus, in some embodiments, further comprises a plurality of additional staining modules and a controller configured to independently control each of the staining modules. The staining modules can use disposable or reusable opposable elements to spread and move reagents across the specimens.

The controller, in some embodiments, includes one or more memories and a programmable processor. The memory stores a first sequence of program instructions and a second sequence of program instructions. The programmable processor is configured to execute the first sequence of program instructions in order to process a specimen on the slide with a first liquid and configured to execute the second sequence of program instructions to process the specimen with a second liquid that is different from the first liquid. In some embodiments, the programmable processor is configured to execute the first sequence of program instructions in order to heat the slide to a first temperature using the slide holder platen, and the controller is configured to execute the second sequence of program instructions in order to heat the slide to a second temperature using the slide platen, the second temperature is different from the first temperature.

The controller, in some embodiments, is configured to execute a first sequence of program instructions to command the replenishment device to deliver a first liquid to the slide at a first rate. The controller is further configured to execute a second sequence of program instructions to command the replenishment device to deliver a second liquid to the slide at a second rate that is different from the first rate. In certain embodiments, the first rate corresponds to an evaporation rate of the first liquid, and the second rate corresponds to an evaporation rate of the second liquid. The controller can help moderate evaporative losses.

In some embodiments, a method of processing a specimen carried by a slide comprises heating a liquid on a slide held by a slide holder. The opposable element is rolled to contact the liquid on the slide and to move the liquid across a biological specimen on the slide. A replenishing rate is determined based on an evaporation rate of the liquid. A supplemental liquid is delivered based on the replenishing rate to substantially compensate for evaporative losses of the liquid. The opposable element, which contacts the liquid comprising the supplemental liquid, is rolled so as to repeatedly contact the specimen with the liquid.

The volume of the supplemental liquid delivered onto the slide can be equal to or greater than a decrease in the volume of the liquid via evaporation. Additionally or alternatively, the supplemental liquid can be delivered onto the slide by delivering the supplemental liquid to keep a volume of the liquid on the slide equal to or greater than a minimum equilibrium volume and at or below a maximum equilibrium volume. Additionally or alternatively, the supplemental liquid can be delivered onto the slide while the opposable element rolls along the slide.

BRIEF DESCRIPTION OF THE DRAWINGS

Non-limiting and non-exhaustive embodiments are described with reference to the following drawings. The same reference numerals refer to like parts or acts throughout the various views, unless otherwise specified.

DETAILED DESCRIPTION OF DRAWINGS

Figure 1:
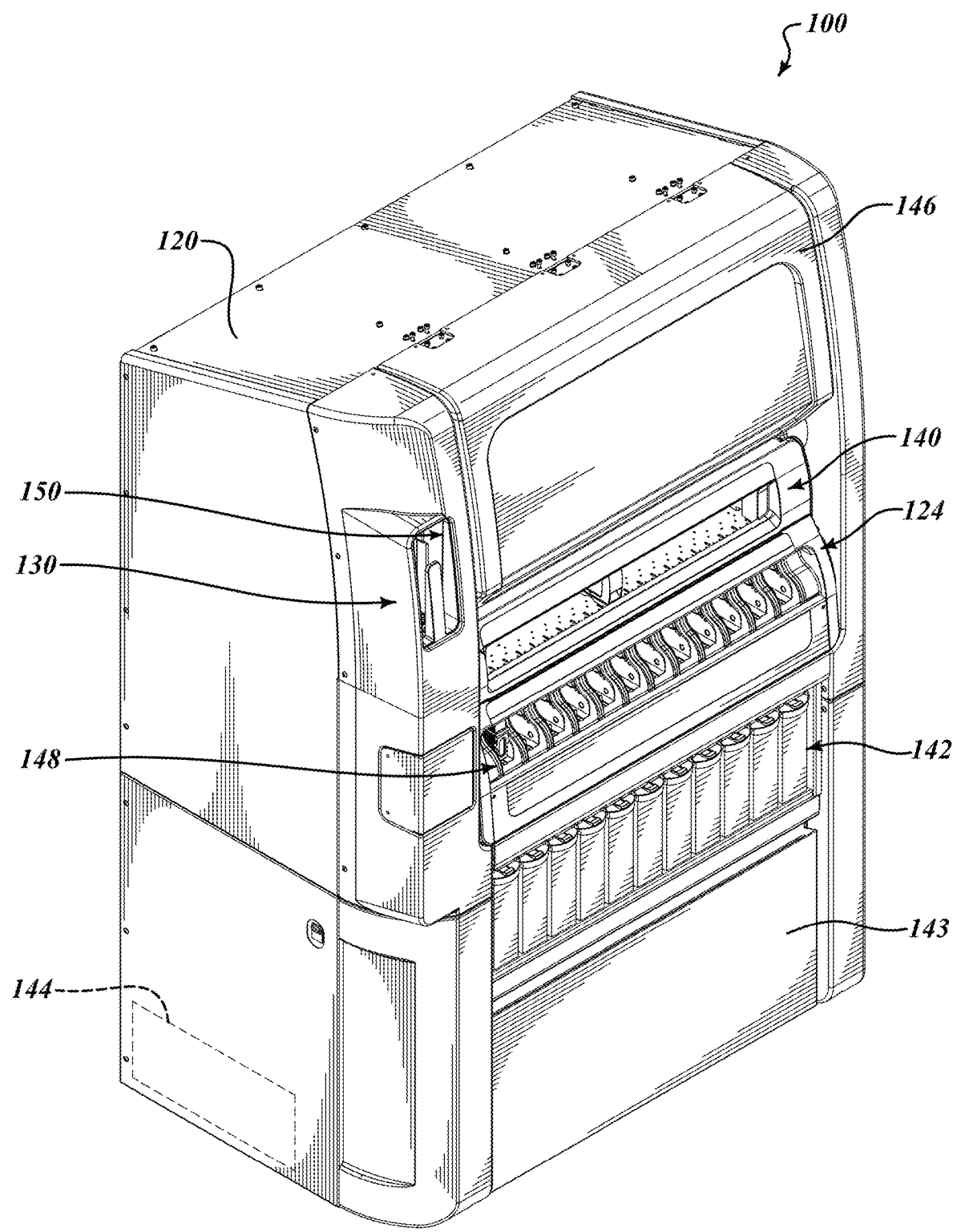
FIG. 1 is an isometric view of a specimen processing system in accordance with an embodiment of the disclosed technology.

FIG. 1 shows a specimen processing system 100 ("system 100") including a protective housing 120, a slide carrier parking station 124 ("parking station 124"), an opposable carrier loading station 130 ("loading station 130"), and reagent parking stations 140, 142. The system 100 can automatically process specimen-bearing slides using opposables loaded via the loading station 130 to perform, for example, specimen conditioning (e.g., cell conditioning, washing, deparaffinizing, etc.), antigen retrieval, staining (e.g., H&E staining), or other types of protocols (e.g., immunohistochemistry protocols, in situ hybridization protocols, etc.) for preparing specimens for visual inspection, fluorescent visualization, microscopy, microanalyses, mass spectrometric methods, imaging (e.g., digital imaging), or other analytical or imaging methods. The system 100 can simultaneously process 20 specimen-bearing slides using the same or different protocols to provide processing flexibility and a relatively high throughput. The specimens can remain on the slides throughout processing (e.g., baking through staining) for convenient handling and preventing cross-contamination.

The protective housing 120 inhibits, limits, or substantially prevents contaminants from entering an internal processing environment. The protective housing 120 can include a cover 146 that can be opened to access internal components, including, without limitation, robotic components (e.g., robotic arms), transport devices (e.g., conveyors, actuators, etc.), fluidic components, specimen processing stations, slide platens, mixing components (e.g., mixing wells, reagent trays, etc.), slide carrier handling components, opposable carrier handling components, dryers, pressurization devices (e.g., pumps, vacuum devices, etc.), or the like.

The parking station 124 includes a row of bays. A slide carrier in the form of a basket is positioned in a left bay 148. Each bay can be configured to receive other types of slide carriers, such as racks, baskets, trays, or other types of carriers suitable for carrying slides before, during, or after specimen processing. The illustrated parking station 124 includes 12 bays separated by dividers. The number of bays, positions of bays, bay orientations, and bay configurations can be selected based on the types of slide carriers to be used.

The loading station 130 includes a receiving opening 150 through which a user can load an opposable carrier. The opposable carrier can be a magazine that holds a stack of opposable elements. In other embodiments, the opposable carriers can be cartridges, or other portable structures for carrying opposables.

The parking stations 140, 142 each includes a row of bays. Each bay can hold one or more containers, including bulk reagent containers, bottles, bag-in-box reagent containers, or the like. The parking station 142 can hold bulk liquid containers that provide liquids used in larger volumes, such as wash solutions. Empty containers in the parking stations 140, 142 can be conveniently replaced with full containers.

Figure 2:
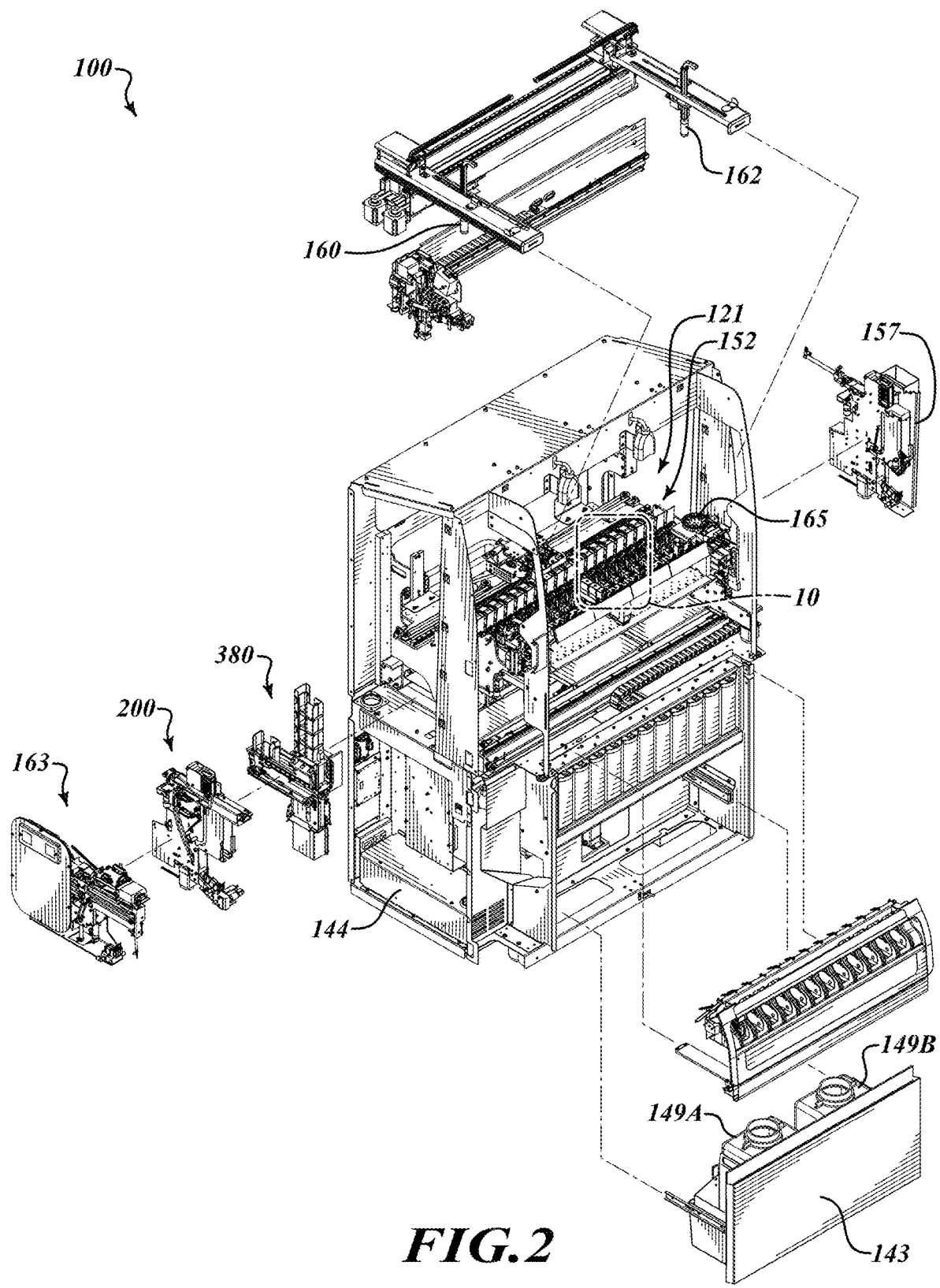
FIG. 2 is an exploded isometric view of the specimen processing system of FIG. 1. Portions of a protective housing are shown removed.

Fluid movement into, out of, and within specimen processing stations can be controlled by a fluidics module that includes, for example, pumps, valves, and filters. A pneumatics module can supply pressurized air and generate vacuums to perform various slide processing operations and to move fluids throughout the system 100. Waste can be delivered to a waste drawer 143. FIG. 2 shows the waste drawer 143 holding waste containers 149A, 149B. The pneumatics module can deliver waste from the specimen processing stations to the containers 149A, 149B, which can be emptied periodically.

A controller 144 can command system components and can generally include, without limitation, one or more computers, central processing units, processing devices, microprocessors, digital signal processors (DSPs), application-specific integrated circuits (ASICs), readers, and the like. To store information, the controller 144 can include, without limitation, one or more storage elements, such as volatile memory, non-volatile memory, read-only memory (ROM), random access memory (RAM), or the like. The stored information can include heating programs, optimization programs, tissue preparation programs, calibration programs, indexing programs, mixing programs, or other executable programs. Optimization programs can be executed to optimize performance (e.g., enhance heating, reduce excess reagent consumption, increase productivity, enhance processing consistency, or the like). The processing may be optimized by determining, for example, an optimum schedule to (1) increase processing speeds, (2) reduce the time of heating or cooling cycles, (3) increase throughput (e.g., increase the number of slides processed in a certain length of time), and/or (4) reduce reagent waste. In some embodiments, the controller 144 determines loading sequences for loading the specimen processing stations to reduce processing times and to determine loading sequences of the dispensers. This saves time because fluids can be dispensed onto the next specimen-bearing slide as soon as a specimen-bearing slide is removed from the specimen processing station. In some embodiments, the controller 144 determines sequences for mixing and dispensing reagent using the mixing station 165.

FIG. 2 is an isometric exploded view of the specimen processing system 100 including a processing station 163, a slide ejector assembly 200, an opposable dispenser 380, and a specimen return mechanism 157. The processing station 163, the slide ejector assembly 200, and the opposable dispenser 380 are positioned at the left side of an internal environment 121. The specimen return mechanism 157 is positioned at the right side of the internal environment 121. A mixing station 165 is positioned generally below the specimen return mechanism 157 and can include reservoirs (e.g., reservoir wells). Reagents can be mixed in the mixing station 165. In other embodiments, the mixing station 165 can hold containers (e.g., vials, beakers, etc.) in which substances are stored and/or mixed. A row 152 of 20 specimen processing stations can independently process biological specimens.

In operation, a user can load slide carriers carrying specimen-bearing slides into the empty bays of the parking station 124 of FIG. 1 and can load opposable carriers carrying opposables into the loading station 130. The slide carriers can be transferred to a reader (e.g., a label reader, a barcode reader, etc.), not shown that reads labels, if any, on the slides. The slide carriers can be delivered to the processing station 163 which can include, without limitation, a dryer (e.g., a dehydration unit), a heating unit (e.g., a baking module), or other component capable of removing water from the slides, heating specimens (e.g., heating specimens to adhere the specimens to the slides), or the like. In some embodiments, the processing station 163 blows hot air over slides to dry the slides, and if the specimens contain paraffin, the hot air can soften the paraffin to promote adhesion of the specimens to the slides. An air system can partially recirculate air to control the humidity in the processing station 163. Slide carriers can be picked up and transported from the processing station 163 to another module (e.g., a specimen processing station, a label reader, etc.) or returned to one of the bays of the parking station 124.

The specimen return mechanism 157 can load specimen-bearing slides into a slide carrier. The loaded slide carriers can be transported to the parking station 124. If the slide carriers are compatible with an automated coverslipper, a user can transport the slide carriers from the parking station 124 to an automated coverslipper for coverslipping. Alternatively, the slides can be manually coverslipped. The coverslipped slides can be analyzed using optical equipment, e.g., a microscope or other optical devices.

Figure 3:
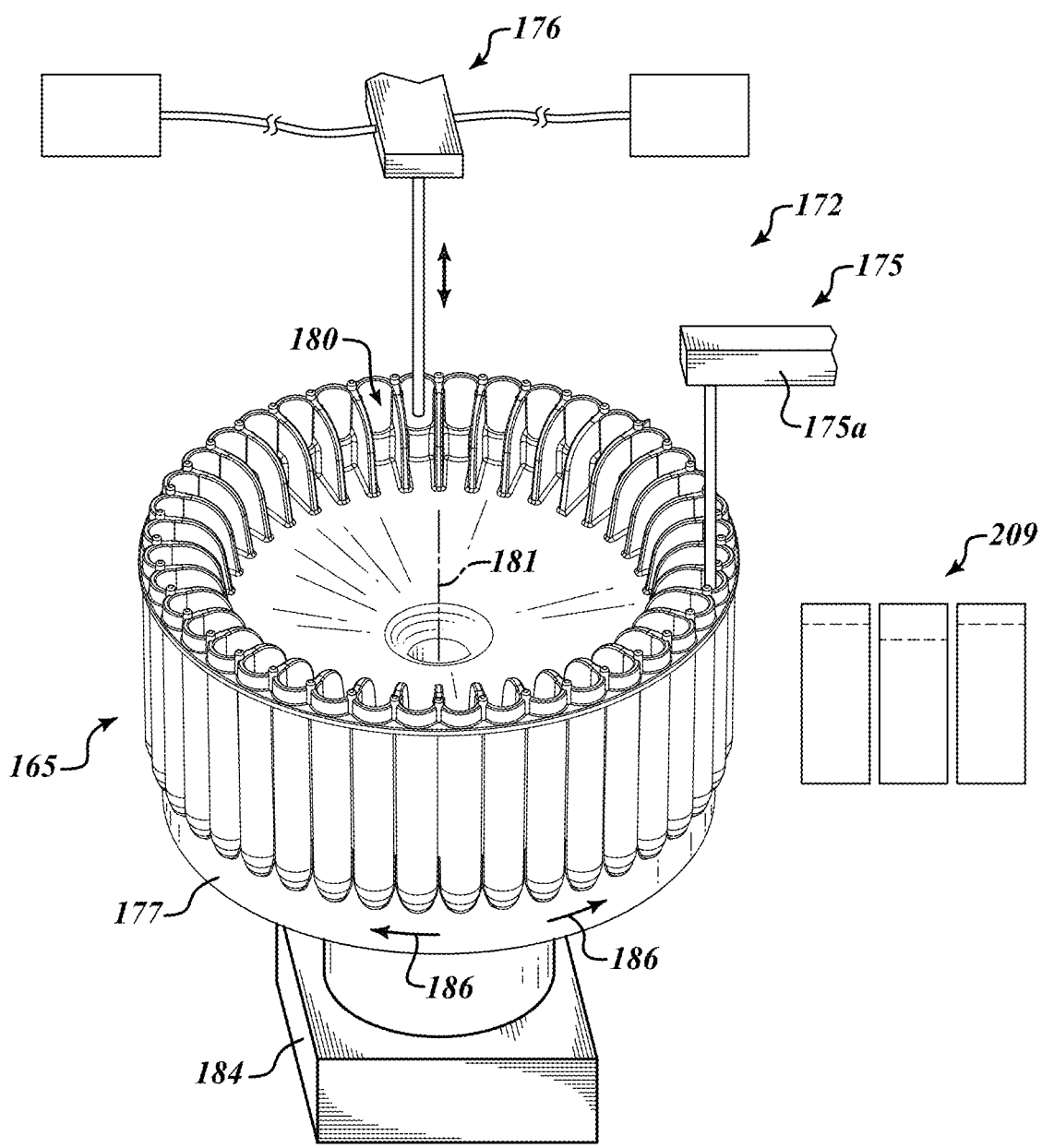
FIG. 3 is an elevational view of a pipette apparatus with a mixing station in accordance with an embodiment of the disclosed technology.

FIG. 3 is an elevational view of a pipette apparatus 172 in accordance with an embodiment of the disclosed technology. The pipette apparatus 172 can serve as a staging area to provide improved stain characteristics, significantly increase processing capacity, or otherwise enhance processing. The pipette apparatus 172 can prepare and hold volumes of reagent (e.g., individual reagents and/or reagent mixtures). Reactive reagents can be mixed immediately before dispensing to enhance stain consistency and quality, especially for reagents that react immediately upon mixing. Because reagents can be staged well before they are needed, the pipette apparatus 172 can increase slide processing capabilities and is well suited for use with high-volume automated slide processing systems. Additionally, the pipette apparatus 172 can occupy a relative small space and provide mix and wash functionality independent of slide processing.

Generally, the pipette apparatus 172 can include a mixing station 165, a reagent pipette assembly 175, and a wash pipette assembly 176. The mixing station 165 can include a carousel 177 and a drive mechanism 184 for rotating the carousel 177 about an axis of rotation 181. The carousel 177 can include a circular array of reservoir wells 180 (one identified) configured to hold volumes of reagent. The drive mechanism 184 can rotate (indicated by arrows 186) the carousel 177 to position the reservoir wells 180 relative to the reagent pipette assembly 175 and/or wash pipette assembly 176. The reagent pipette assembly 175 can partially or completely fill the reservoir wells 180 with fresh reagent from a filling station 209 (e.g., a reagent bay) and can also dispense reagent from the reservoir wells 180 onto microscope slides. The reagent pipette assembly 175 can also wash and/or rinse the reservoir wells or perform other operations. The wash pipette assembly 176 can wash the reservoir wells 180 by, for example, rinsing the reservoir wells 180 with wash liquid and vacuuming liquid (e.g., wash liquid, reagent, etc.) out of the reservoir wells 180. Fresh reagents can be mixed in the washed reservoir wells 180.

Figure 4:
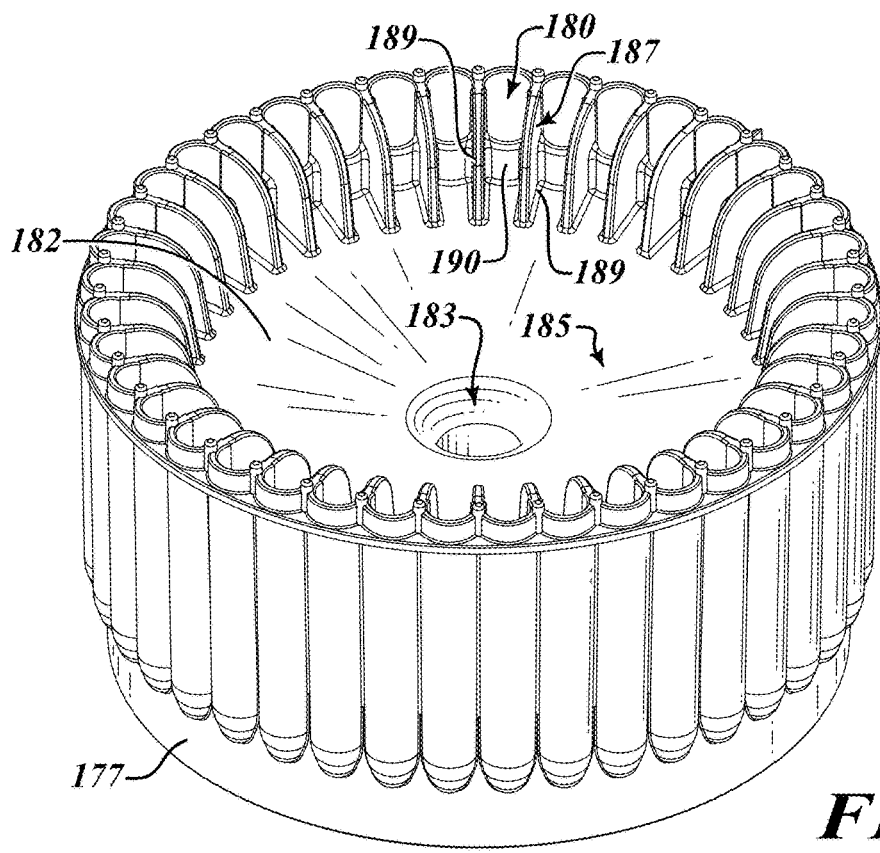
FIG. 4 is an isometric view of a carousel in accordance with an embodiment of the disclosed technology.
Figure 5:
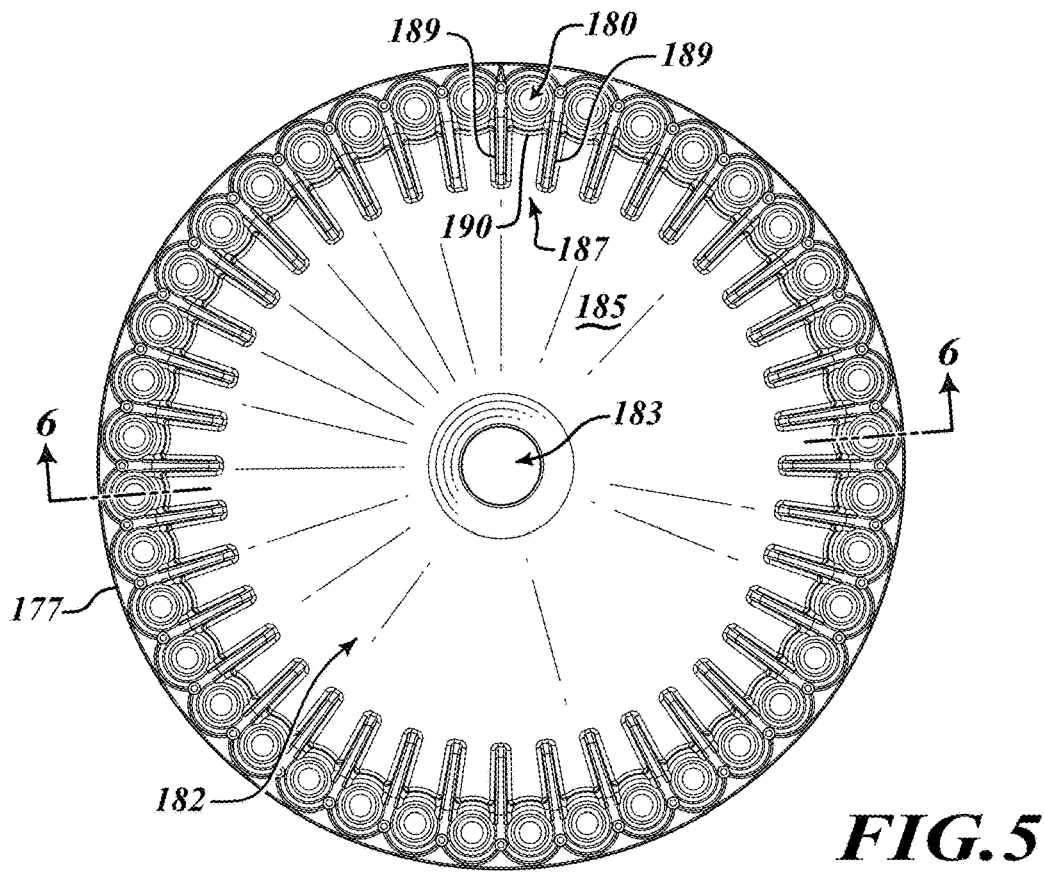
FIG. 5 is a top plan view of the carousel of FIG. 4.

FIG. 4 is a front top isometric view of the carousel 177 in accordance with an embodiment of the disclosed technology. FIG. 5 is a top plan view of the carousel 177. Referring to FIGS. 4 and 5 together, the carousel 177 can include reservoir wells 180 (one identified), a ramp 182, and a drain 183. The reservoir wells 180 can be angularly spaced (evenly or unevenly) about the drain 183, and each reservoir well 180 can hold a sufficient volume of liquid for one or multiple dispense steps in a staining protocol. In some embodiments, each reservoir well 180 has a holding capacity in a range of about 200 µL to about 450 µL. In one embodiment, each reservoir well 180 has a holding capacity of about 350 µL. In other embodiments, different reservoir wells 180 can have different holding capacities to prepare different volumes of reagent mixtures. The holding capacities of the reservoir wells 180 can be selected based on the desired volume of reagent mixtures to be dispensed. A group of reservoir wells 180 (e.g., four reservoir wells) can correspond to a particular slide and/or slide processing station to prevent cross-contamination. In a staining protocol utilizing a set number of reagent mixtures, reservoir wells (e.g., adjacent reservoir wells 180) can be used to prepare and hold the reagent mixtures. In some embodiments, the carousel 177 can include multiple arrays of wells positioned at different locations relative to the drain 183. For example, multiple circular arrays of reservoir wells can be positioned at different radii from the center drain radii of the center drain 183.

The reservoir wells 180 can be in generally vertical orientations (e.g., longitudinal axes of the reservoir wells can be oriented vertically) to access to the bottoms of the reservoir wells 180 using vertically-oriented pipettes. The reservoir wells 180 may be circular (FIG. 5), oval, elliptical, combinations thereof, or other shapes without sharp corners for convenient rinsing/cleaning. The illustrated carousel 177 has multiple reservoir wells 180 (e.g., forty reservoir wells 180) to allow rapid processing of a relatively large number of slides (e.g., up to about one hundred slides or more), but the carousel 177 can have a greater or a lesser number of reservoir wells 180 to increase or decrease the number of slides serviced by the carousel 177. The geometry (e.g., circular, elliptical, etc.), pattern (e.g., circular array, elliptical array, etc.), number, and orientations of the reservoir wells 180 can be selected based on the number of slides, staining protocols, and operation of the reagent pipette assembly 175 and/or wash pipette assembly 176.

The ramp 182 can extend between the reservoir wells 180 and the drain 183. Overflow liquid (e.g., reagent, wash liquid, or mixtures thereof) escaping the reservoir wells 180 can flow along an upper surface 185 of the ramp 182 and through the drain 183. In some embodiments, the upper surface 185 slopes downwardly toward the drain 183 and has a shape (e.g., a generally frusto-conical shape) for promoting radially inward flow. The upper surface 185 can help keep the flows from two or more reservoir wells 180 separate to inhibit or limit mixing of the flows to avoid or mitigate unintended chemical reactions. In some embodiments, the ramp 182 has flow channels, grooves, or other features that help overflow liquid flow toward the drain 183.

Referring now to FIG. 4, the carousel 177 can include spillways 187 (one identified) configured to allow overflow liquid to automatically drain from the reservoir wells 180. The spillways 187 can prevent cross-contamination by preventing well to well flooding. During a wash cycle, the reservoir wells 180 can be flooded with wash liquid (e.g., water, deionized water, washing solution, etc.) without affecting adjacent reservoir wells 180. In some embodiments, the spillway 187 includes overflow partitions 189 (two identified in FIGS. 4 and 5) and an overflow wall 190. Each partition 189 can be positioned between adjacent reservoir wells 180.

Figure 6:
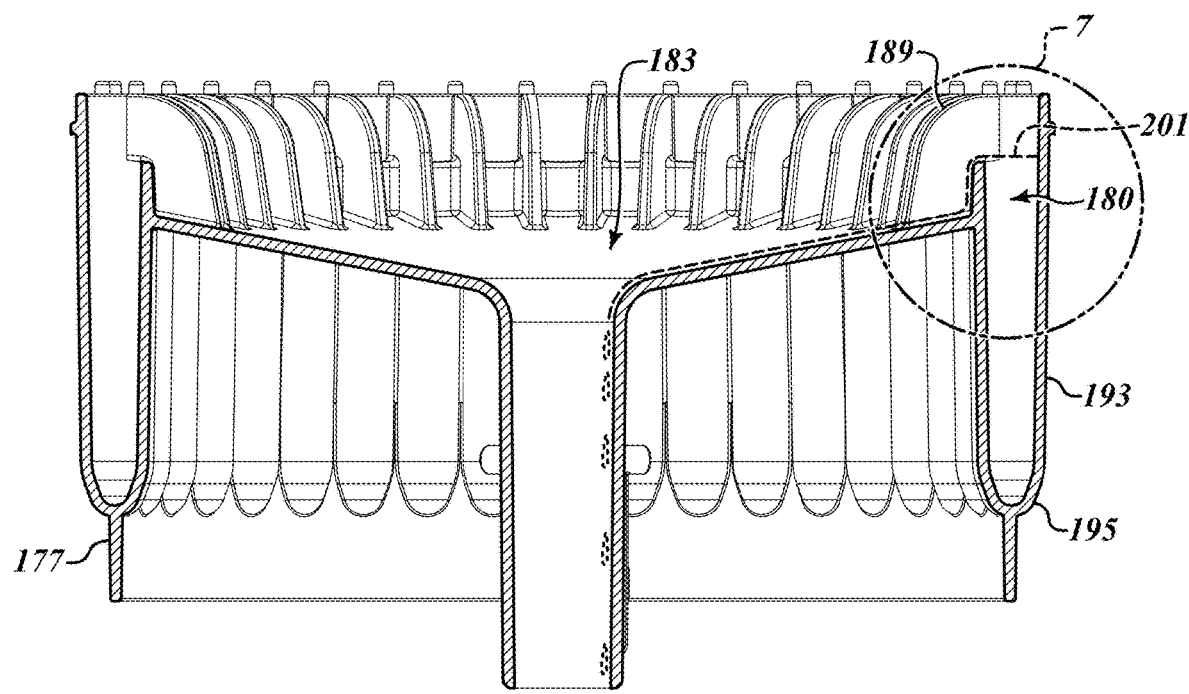
FIG. 6 is a cross-sectional view of the carousel taken along line 6-6 of FIG. 5.
Figure 7:
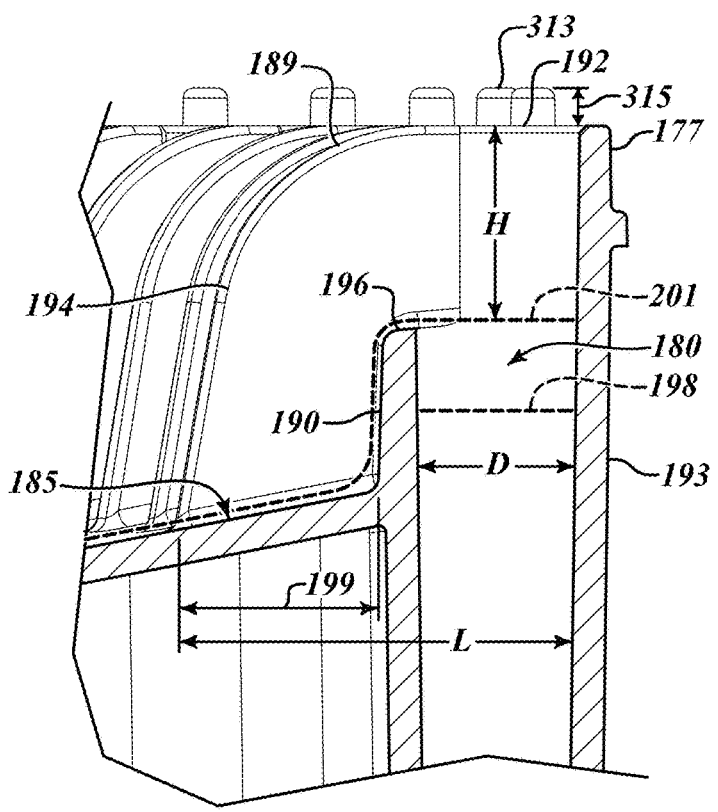
FIG. 7 is a detailed view of a portion of the carousel of FIG. 6.

FIG. 6 is a cross-sectional view of the carousel 177 taken along line 6-6 of FIG. 5. FIG. 7 is a detailed view of a portion of the carousel 177. Referring now to FIG. 7, the partition 189 can prevent splattering liquid from reaching nearby reservoir wells and can include an outer portion 192 and an inner portion 194. In some embodiments, the partition 189 can be positioned between the center of an adjacent reservoir well 180 and other reservoir wells (e.g., ⅕, ¼, of ⅓ of the total number of reservoir wells 180). During a wash cycle, wash liquid may tend to spray and/or splatter, and the partition 189 can block such spray/splatter, thereby preventing cross-contamination between wells. The dimensions and configurations of the partitions 189 can be selected to keep the reservoir wells fluidically isolated from one another.

The outer portion 192 can be positioned directly between two reservoir wells and can extend upwardly past a spillway entrance in the form of a rim 196 of the wall 190. In some embodiments, the outer portion 192 extends upwardly past the rim 196 a sufficient distance to prevent well to well flooding. For example, the height H of the outer portion 192 can be in a range of about 3 mm to about 7 mm. Other heights can be used, if needed or desired. The inner portion 194 can be a generally vertically-oriented wall that extends inward (e.g., toward the center of the carousel 177). A length 199 of the inner portion 194 can be generally equal to the height H to prevent directing liquid (e.g., rinse liquid or reagent) toward an unintended well at the risk of cross contamination. The length L of the partition 189 can be equal to or greater than the diameter D of the reservoir well 180. For example, a ratio of the length L to the diameter D can be equal to or greater than 1.25, 1.5, 2, or 2.5.

The reservoir well 180 has a generally smooth sidewall 193 (e.g., a cylindrical sidewall or other shaped sidewall without sharp corners) and a bottom 195 (FIG. 6) that define a chamber capable of holding a desired a volume, for example, 250 µL, 350 µL, or 450 µL. FIG. 7 shows a fluid level line 198 (illustrated in phantom line) of a desired volume of reagent. When excess liquid is delivered to the reservoir well 180, the liquid can rise above the entrance 196 of the spillway 180 and cause flooding. As shown in FIG. 7, the liquid 201 (illustrated in phantom line) can flow over the wall 190 and along the upper surface 185. Referring now to FIG. 6, the liquid 201 can exit the carousel 177 via the drain 183, which can be sufficiently large to accommodate fluid draining from multiple reservoir wells. Flooding can intentionally occur to rinse the reservoir wells and may unintentionally occur, for example, if excess reagent is dispensed into one of the reservoir wells.

FIG. 7 shows stops 313 (one identified) that limit the maximum depth of plunge of pipettes to prevent damage to the carousel 177 that could be caused by, for example, an over-insertion of the pipette. The stops 313 can be circumferentially spaced apart from each other and can extend upwardly a sufficient distance 315 to prevent the wash pipette 213 and/or reagent pipette 204 from contacting the reservoir well bottom 195. For example, a head assembly carrying the pipette can strike the stop 313 before the pipette carried by the head assembly damages the carousel 177. Other types of stops can be used to position or limit movement of the pipettes.

Figure 8:
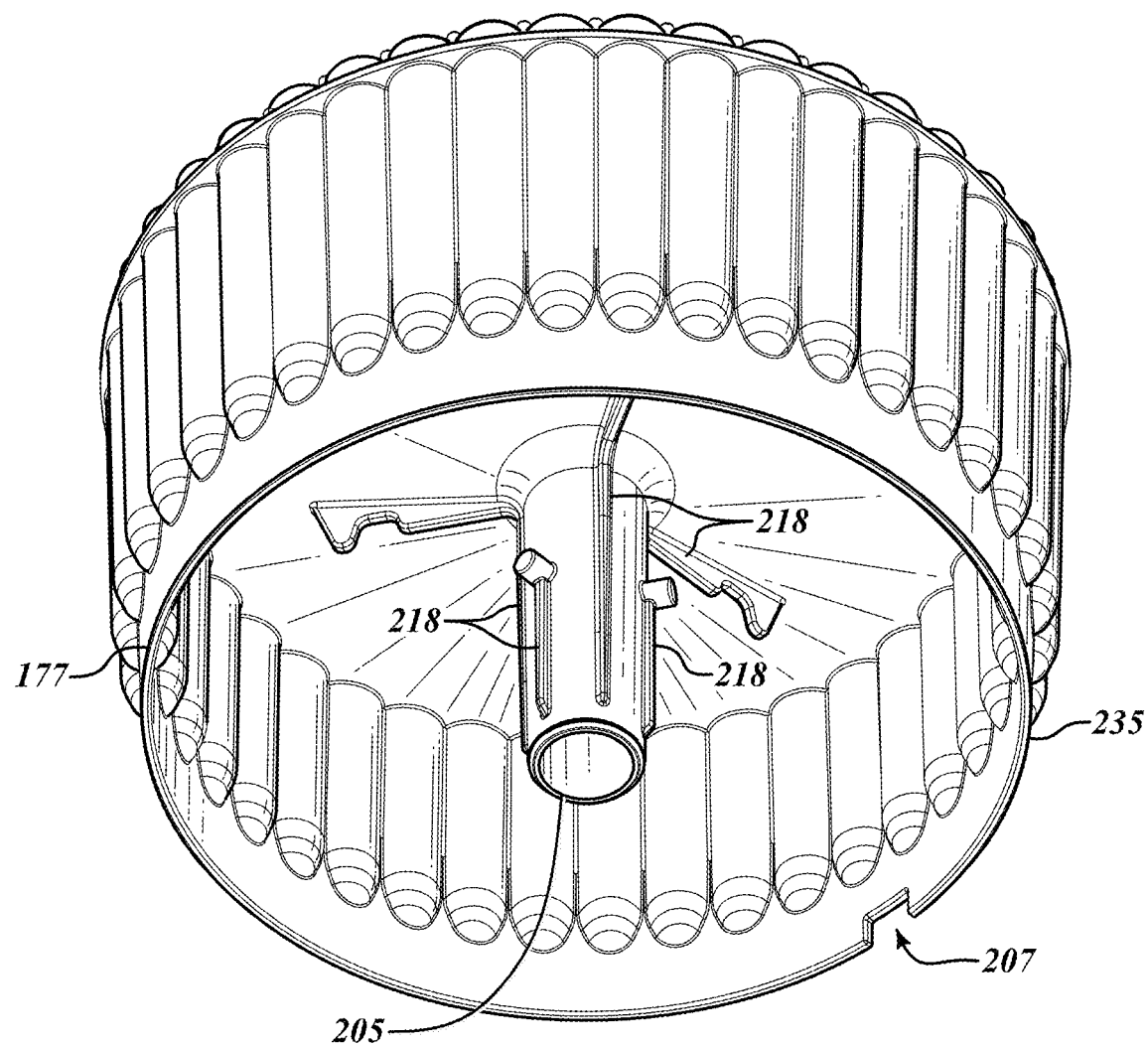
FIG. 8 is a bottom perspective view of the carousel in accordance with an embodiment of the disclosed technology.

FIG. 8 is a bottom perspective view of the carousel 177 that includes a mounting bayonet 205 and an alignment feature 207. The mounting bayonet 205 can be coupled to a drive shaft of a drive mechanism (e.g., drive mechanism 184 of FIG. 4) and can include one or more positioners 218. In other embodiments, the outer surface of the carousel 177 can be used to rotate the carousel 177. For example, a drive wheel can engage the outer surface of the carousel 177 such that rotation of the drive wheel causes rotation of the carousel 177. The positioners 218 can be flanges, ribs, or other features matable with the drive shaft of the drive mechanism. The alignment feature 207 can be used to visually, mechanically, electro-mechanically, and/or opto-mechanically align the carousel 177. In some embodiments, the alignment feature 207 is a notch or a cutout that receives an alignment protrusion of the drive mechanism. In other embodiments, the alignment feature 207 can be a protrusion or other visually (including optically) identifiable feature for convenient identification and orientation of the carousel 177. In some embodiments, the alignment feature 207 can be used to clock the carousel 177 such that individual reservoir well 180 positions are known by the control system (e.g., controller 144). A top edge or surface 231 can be located at a critical distance from the bottom of a skirt 235 in which it resides, such that if a sensor (e.g., an optical sensor) does not identify the alignment feature 207, then the user will be immediately notified that the carousel 177 is improperly installed. The carousels described herein can be conveniently removed from drive mechanism 184 to wash it or replace it, and the alignment feature 207 can be used to reinstall the carousel 177 on the drive mechanism 164. One side of the alignment feature 207 can be detected and used to notify the operator if the carousel 177 is not properly installed.

A one-piece carousel can have a unitary construction and can be formed by a molding process, machining process, or other suitable process. For example, the carousel 177 can be monolithically formed by an injection molding process. In multi-piece embodiments, the carousel 177 can have a carousel main body and separate spillways and reservoir wells that are installed in the carousel main body. The configuration of the carousel 177 can be selected based on the desired functionality of the carousel 177.

Figure 9A:
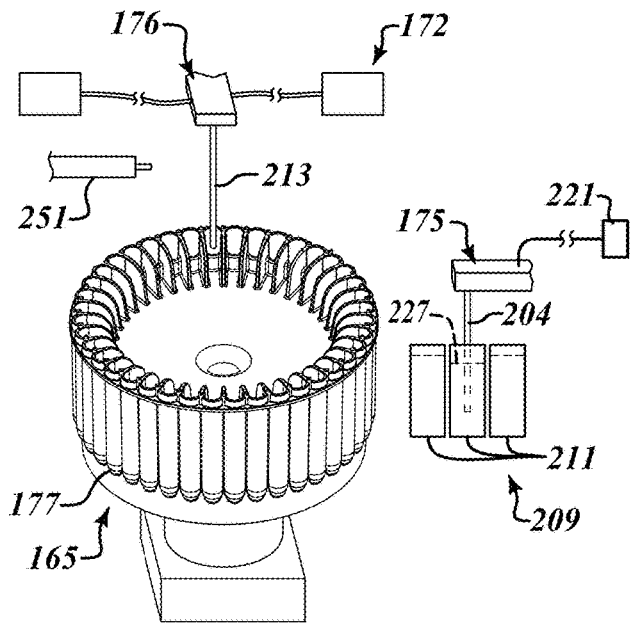
FIGS. 9A-9D illustrate stages of operation of the pipette apparatus.
Figure 9B:
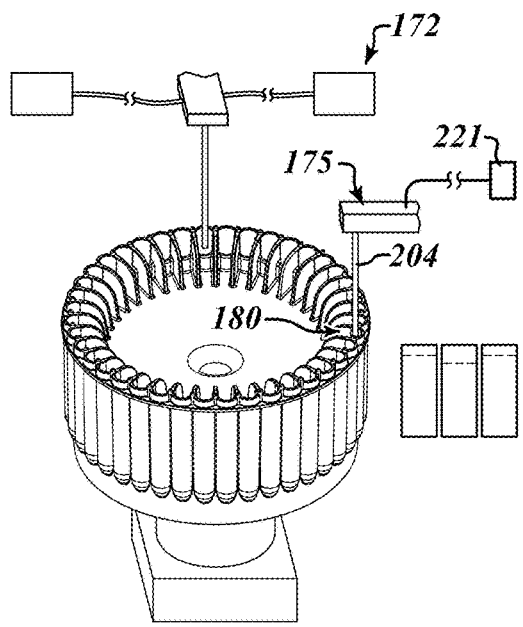
Figure 9C:
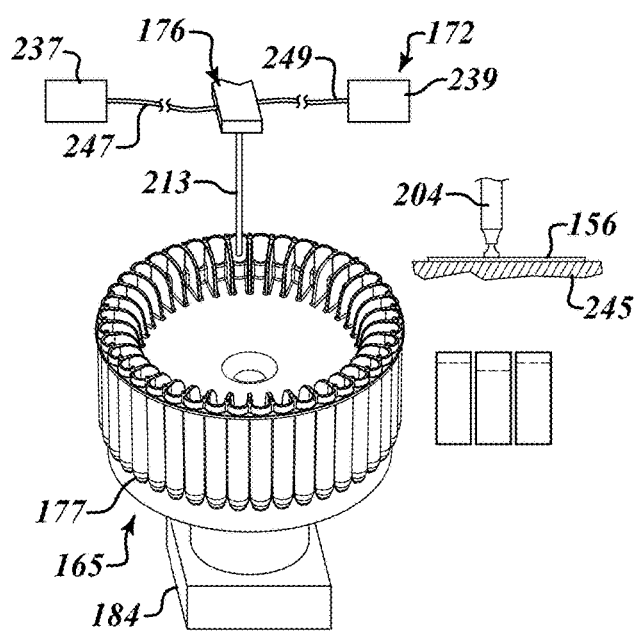
Figure 9D:
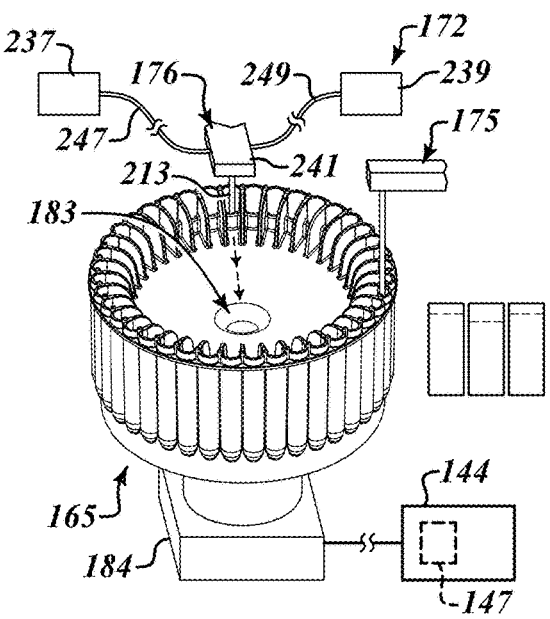
Figures 9H, 9I:
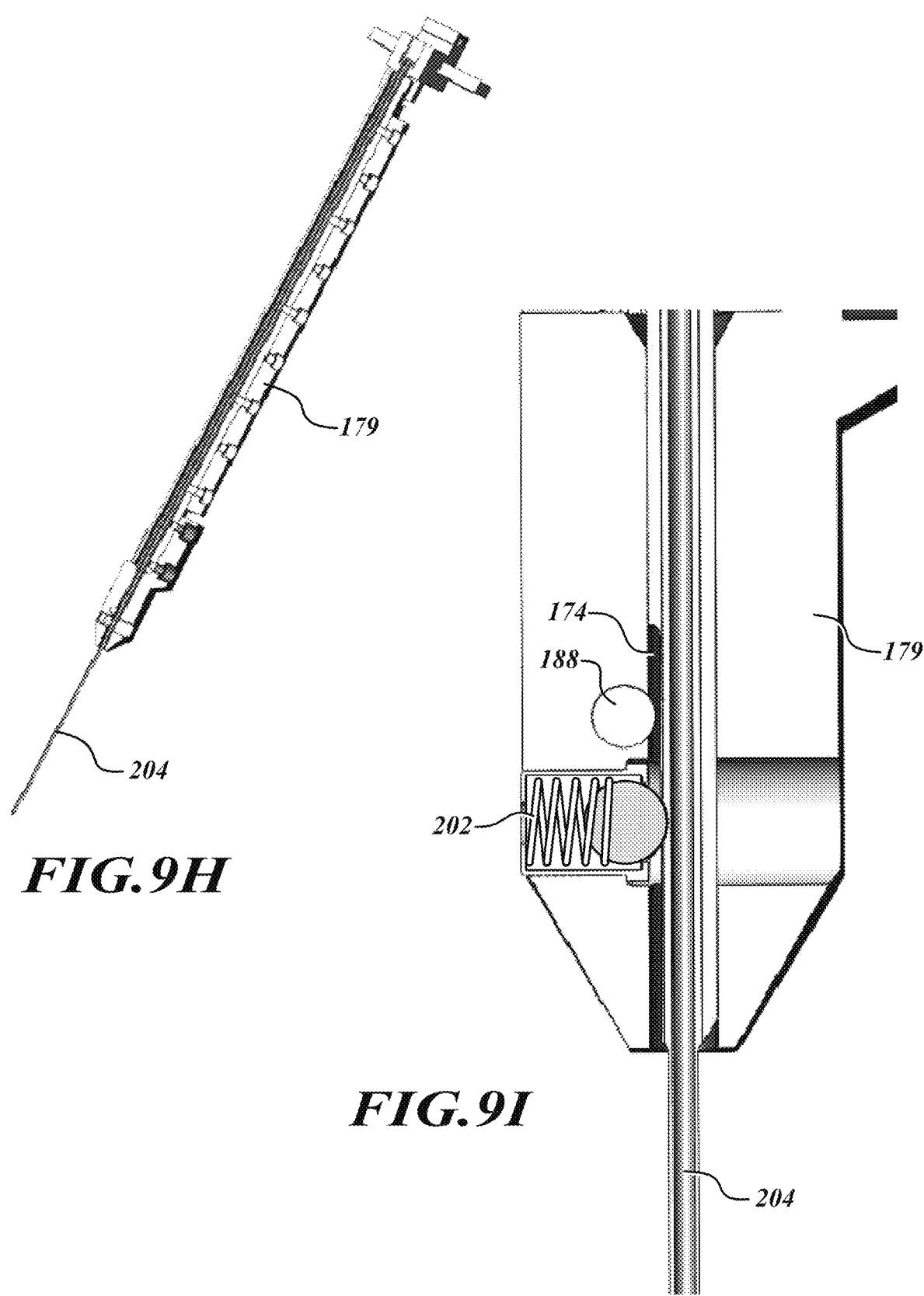
FIGS. 9E-9Y are views of various components of the pipette apparatus in accordance with various embodiments of the present technology.
Figure 9J:
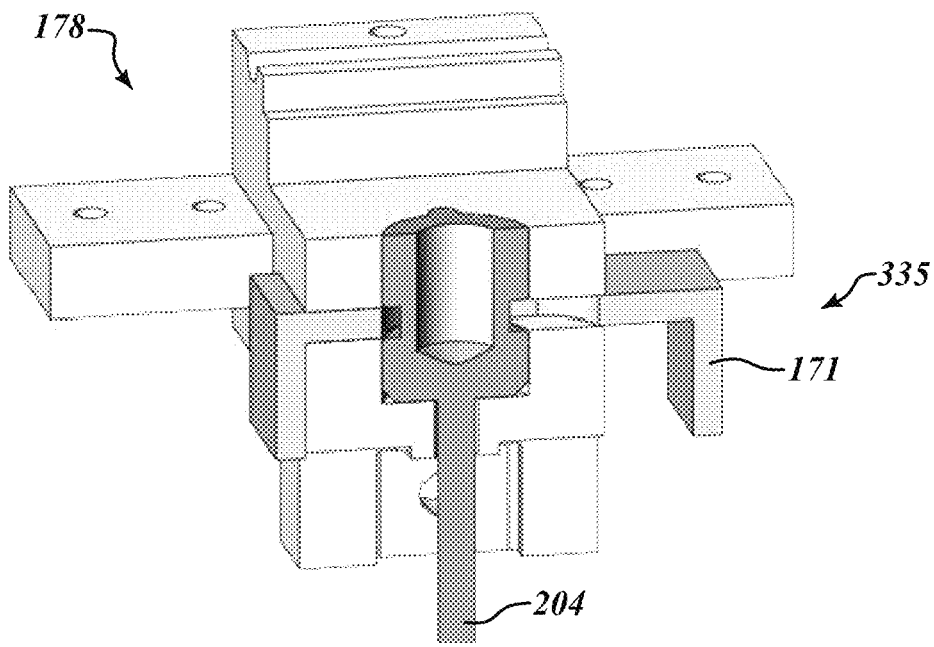
Figure 9K:
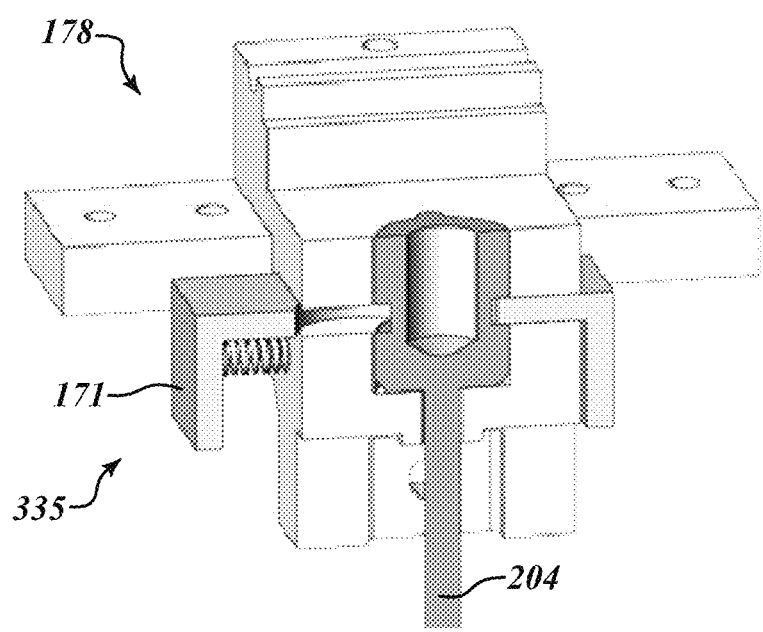
Figure 9L:
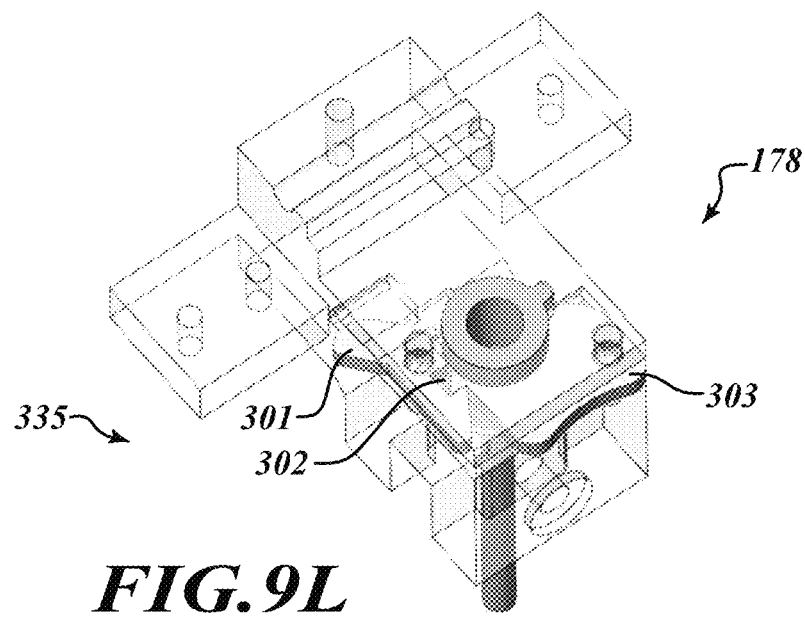
Figure 9M:
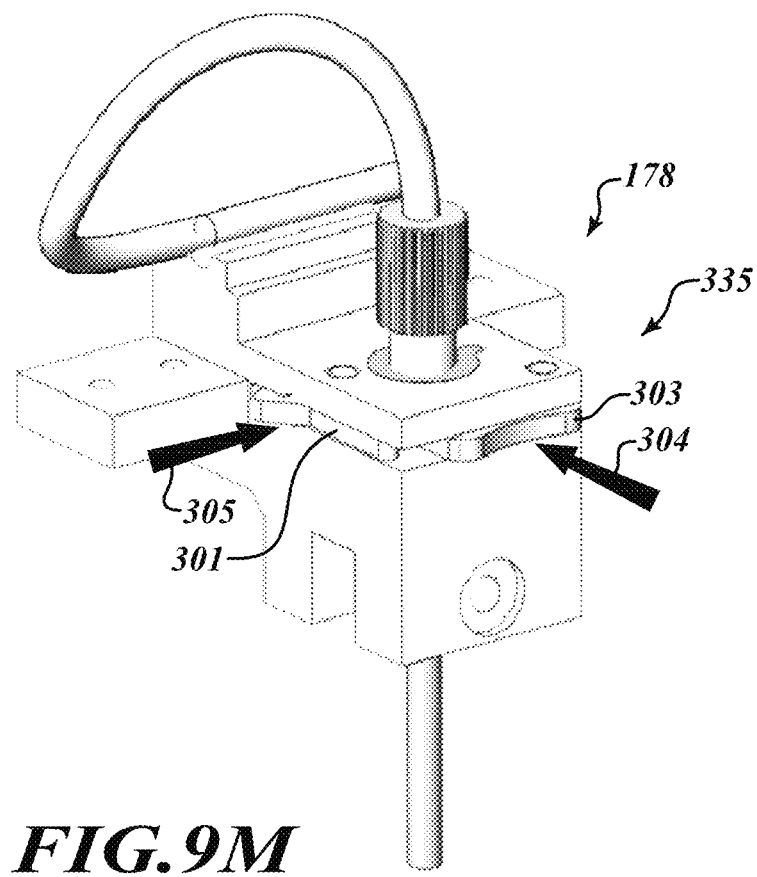
Figure 9N:
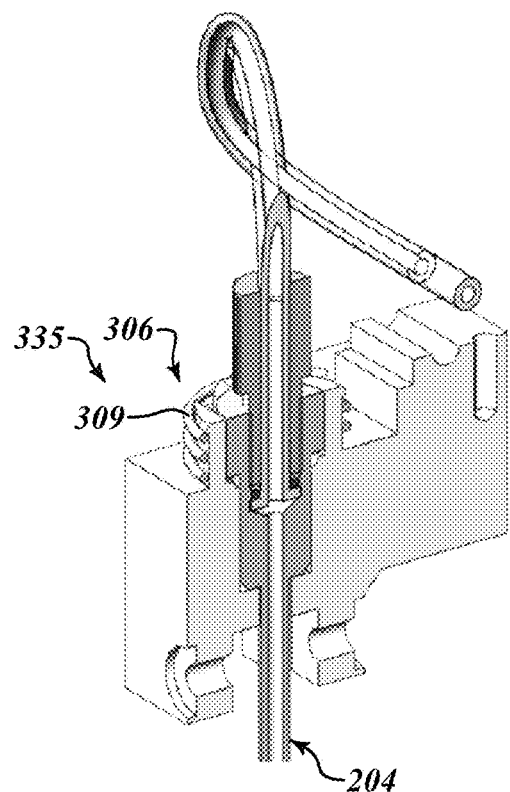
Figure 9O:
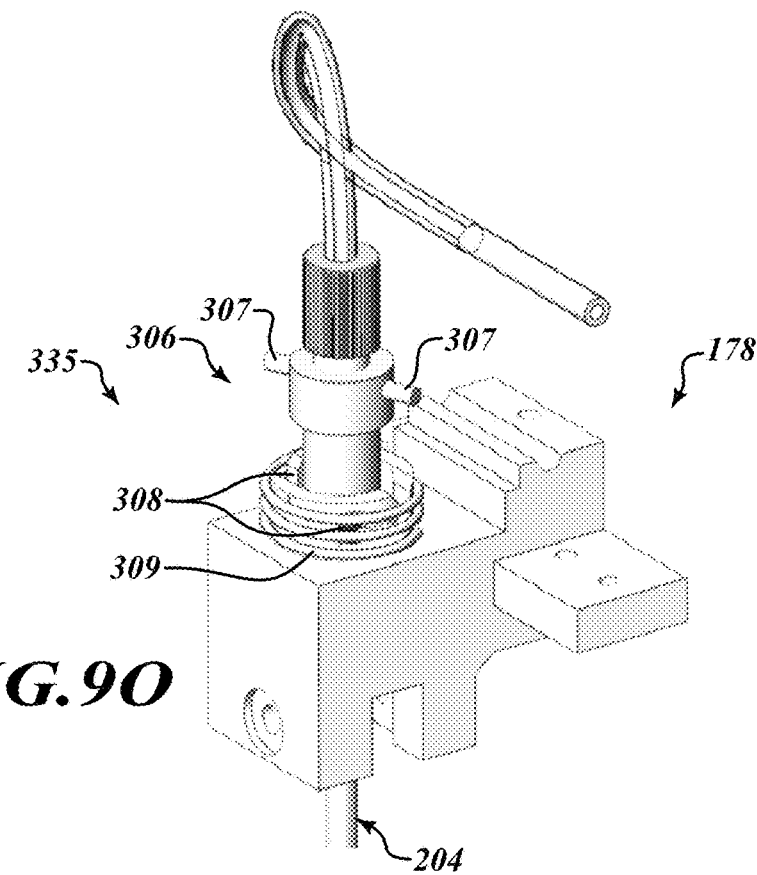
Figure 9P:
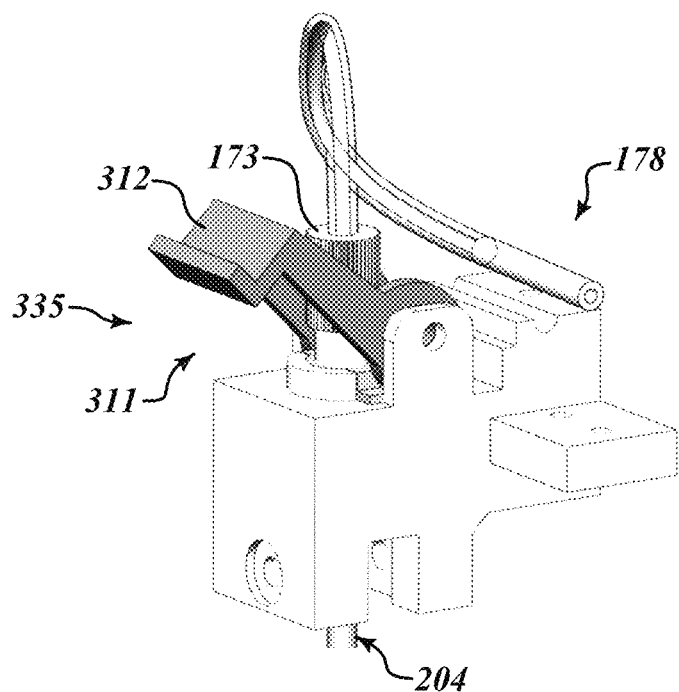
Figure 9Q:
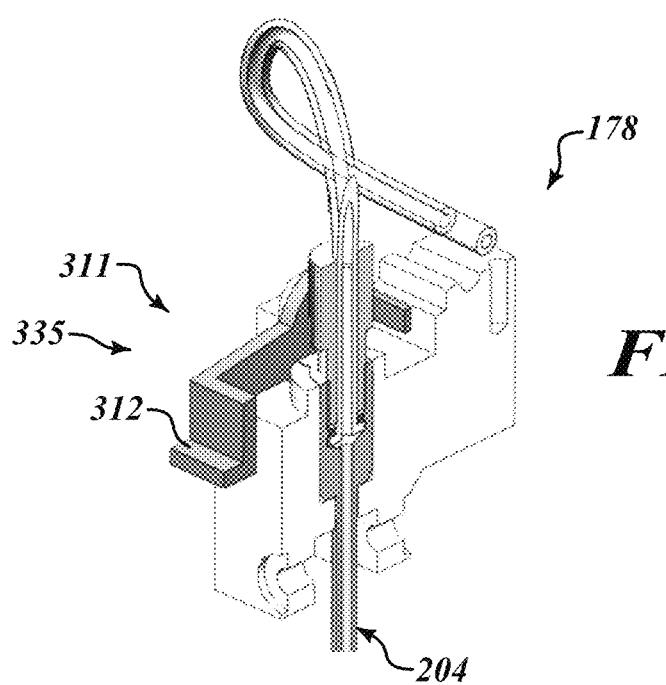
Figure 9V:
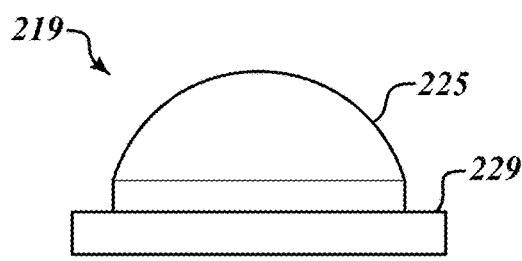
Figure 9W:
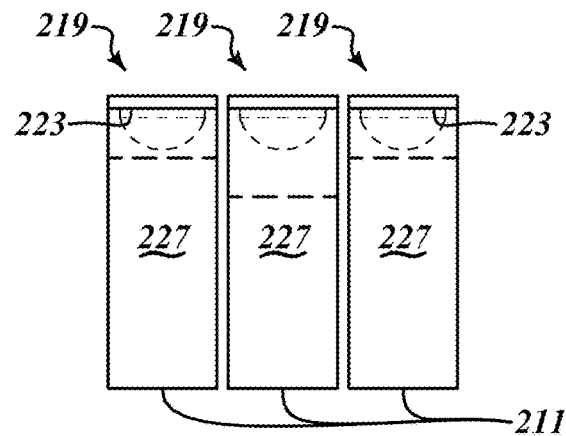
Figure 9X:
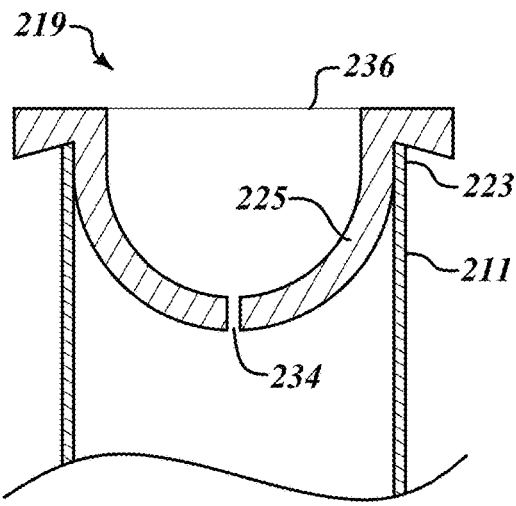
Figure 9Y:
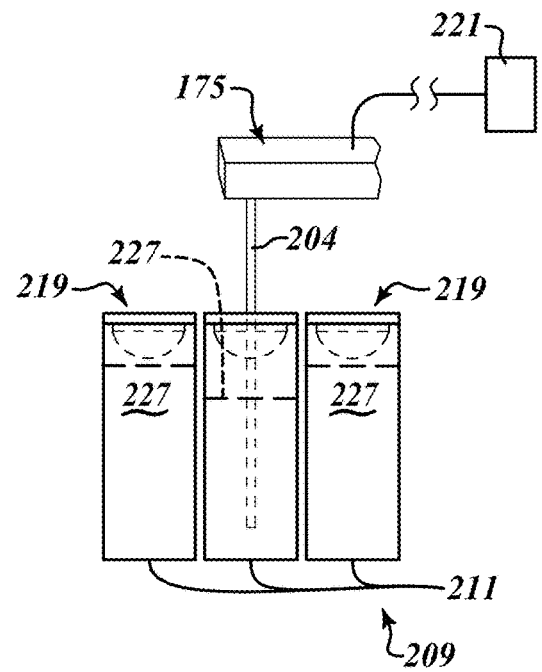

FIGS. 9A-9D show operation of the pipette apparatus 172, and FIGS. 9E-9Y are isometric views illustrating individual components of the pipette apparatus 172 in accordance with various embodiments of the present technology. Generally, the reagent pipette assembly 175 can sequentially deliver fresh reagents to the reservoir wells 180 to produce reagent mixtures. The reagent pipette assembly 175 can deliver such reagent mixtures onto slides at slide processing stations. The carousel 177 can be rotated to sequentially position the reservoir wells 180 at a wash position for washing by the wash pipette assembly 176. In some embodiments, the reagent pipette assembly 175 can mix reagents while the wash pipette assembly 176 washes reservoir wells 180 to reduce overall processing times. In other embodiments, reagent mixing and reservoir well washing are performed at different times. A pipette cleaner 251 can wash (e.g., using wash liquid), vacuum, blow off, or otherwise clean the pipette 204 between each trip to the filling station 209 to prevent cross contamination of the reagents. The pipette cleaner 251 can also clean the pipette 213 between wash operations. Operation of the reagent pipette assembly 175, wash pipette assembly 176, and mixing station 165 are detailed below.

FIGS. 9A-9C show one method of utilizing the reagent pipette assembly 175, and FIGS. 9E-9Y illustrate components of the pipette apparatus 172 in accordance with embodiments of the present technology. The reagent pipette assembly 175 can have different types of pipettes, valves, and sensors, and in some embodiments, can be similar or identical to the pipette dispensers 160, 162 depicted in FIG. 2. In various embodiments, the reagent pipette assembly 175 can include a positioning mechanism with one or more rail/carriage assemblies, motors (e.g., drive motors, stepper motors, etc.), drive elements (e.g., chains, belts, etc.), or other features for providing motion. The reagent pipette assembly 175 can obtain fresh reagents, stage reagents, and dispense reagents onto microscope slides. In some embodiments, the reagent pipette assembly 175 can move the reagent pipette 204 to, for example, a filling position (see FIG. 9A) at the filling station 209, an unload/load position (FIG. 9B) for either dispensing reagent into one of the reservoir wells 180 or loading the pipette 204 with reagent from one of the reservoir wells, and a dispense position (FIG. 9C) for dispensing reagent onto a slide at a slide processing system.

Referring to FIG. 9E, the reagent pipette assembly 175 also includes a carriage assembly 178 with retainer 179 (e.g., a collet, etc.) for releasably securing the reagent pipette 204 in position during operation. To replace a reagent pipette 204, the retainer 179 can be moved to an open configuration for releasing a first pipette 204 and receiving a second (e.g., replacement) pipette 204. The retainer 179 can be engaged by a user or with an automatic apparatus to close and retain the second pipette 204 for use in the system 100 (FIGS. 1 and 2). The pipette 204, when replaced, can be inserted down the z-axis of the retainer 179 and can be aligned in the z-direction and about the z-axis of rotation (e.g., with securing screws 191, a spring mechanism, etc.) before securing/sealing the pipette 204 to a fluid tube 173 with a connection port 197 for permitting fluid flow (e.g., wash solution, vacuum air flow, etc.; see FIG. 9F). In one embodiment, the connection port 197 can be a hollow threaded screw that secures the fluid tube 173 to the pipette 204 within the retainer 179 portion of the carriage assembly 178.

In some embodiments, the pipette 204 can be received in an oriented position within the retainer 179 to facilitate reproducible alignment of the pipette 204 during insertion and/or replacement. For example, the pipette 204 can be configured with an alignment feature in the form of a flat surface 174 along a portion of the pipette 204 (FIG. 9G) that is configured to engage with a rotation inhibitor in the form of an orienting pin 188 and spring mechanism 202 (FIGS. 9H and 9I) within the retainer 179 to position and/or align the pipette 204 within the retainer 179 and with respect to the carriage assembly 175. In other embodiments, the pipette 204 can have alignment features the form of grooves, slots, or other structural features configured to engage rotation inhibitors (e.g., pins, rods, protrusions, springs, etc.) of the retainer 179 to substantially prevent or limit movement of the pipette 204 relative to the retainer 179.

After the pipette 204 is placed in the correct position and orientation, the retainer 179 can be transitioned from the open configuration to a closed configuration to secure the pipette 204 in position using a locking mechanism 335. Referring back to FIG. 9F, the locking mechanism 335 can be a hollow threaded screw that connects the fluid tube 173 to the pipette 204 within the retainer 179. As illustrated in FIGS. 9J-9K, and in another embodiment, the retainer 179 can be configured to be manually closed about the pipette 204 using a sliding clamp 171 configured to transition the retainer 179 between the open configuration (FIG. 9J) and a closed configuration (FIG. 9K). In one embodiment, the sliding clamp 171 can be a spring-loaded sliding keyed sheet that locks the pipette 204 in a secured position with respect to the retainer 179 and the reagent pipette assembly 175. FIGS. 9L-9M illustrate a locking mechanism 335 for the pipette 204 in the retainer 179 in accordance with another embodiment of the present technology. For example, the carriage assembly 178 includes a rotating plate 301 with a catch 302 and a locking plate 303 configured to engage the catch 302 when pressed in the direction of arrow 304 (FIG. 9M). To release the pipette from the locked position, the rotating plate 301 can be pressed in the direction of arrow 305 (FIG. 9M) to release the locking plate 303 from the catch 302. FIGS. 9N-9O illustrate a locking mechanism 335 for the pipette 204 in the retainer 179 in accordance with a further embodiment of the present technology. As illustrated in FIG. 9O, the carriage assembly 178 can include a bayonet mount 306 to secure the pipette within the retainer 179. For example, the pins 307 on the pipette 204 can mate with the slots 308 on the carriage assembly 178 which connection is held in place with a spring 309 (shown in FIG. 9N).

FIGS. 9P and 9Q are isometric and cross-sectional views of components of the carriage assembly 178. As illustrated in FIGS. 9P and 9Q, the retainer 179 can be configured to be manually closed about the pipette 204 with the fluid port 173 secured to the pipette 204 using a clamp 311 configured to transition the retainer 179 between the open configuration (FIG. 9P) and a closed configuration (FIG. 9Q). In one embodiment, the clamp 311 can be a lever-positioned clamp in which a lever 312 is transitioned from a raised position (FIG. 9P) to a lowered position (FIG. 9Q) to tighten the retainer 179 about the pipette 204.

Referring now to FIG. 9A, the reagent pipette assembly 175 in a reagent load state of operation can insert the pipette 204 into one of the containers 211 at the filling station 209 and can draw a desired volume of fresh reagent 227. In some embodiments, the reagent pipette assembly 175 can draw a vacuum provided by a pressurization device 221. The pressurization device 221 can include one or more vacuum sources, pumps, or other devices capable of providing a desired vacuum level or positive pressure. The containers 211 can be, without limitation, vials, bottles, jars, or other containers suitable for holding substances used to process specimens. The illustrated filling station 209 has three containers 211, but a greater or lesser number of containers can be used, and the filling station 209 can be part of a parking station, such as the parking stations 140, 142 of FIG. 1. For example, the containers 211 can be installed in the bays of the parking stations 140, 142 of FIG. 1 and can be accessed by the reagent pipette assembly 175, which is movable through the internal environment 121 of FIG. 2.

FIG. 9R is an isometric view of a pipette 204 for use in the reagent pipette assembly 175 shown in FIG. 3, and FIG. 9S is a close-up view of a distal end 206 of the pipette 204 of FIG. 9R in accordance with an embodiment of the present technology. Referring to FIGS. 9R and 9S together, the pipette 204 can be generally straight having a proximal end 208 (FIG. 9R) and the distal end 206, wherein the proximal end 208 is configured to couple with the body 175a of the reagent pipette assembly 175 (FIG. 3). As shown in FIG. 9R and in some embodiments, the proximal end 208 is flanged for engaging the body 175a (e.g., a portion of the carriage assembly 178) of the reagent pipette assembly 175 (FIG. 3). The distal end 206 is configured to be inserted into the containers 211 at the filling station 209 as well as the reservoir wells 180 of the carousel 177 (FIGS. 9A and 9B). The pipette 204 includes a lumen 203 through which a desired volume of reagent may be loaded or dispensed (e.g., via the pressurization device 221 capable of providing a desired vacuum level or positive pressure; FIG. 9A). As illustrated in FIG. 9S, the distal tip 206a of the distal end 206 can be circular and have a blunt or even tip. In another embodiment shown in FIG. 9T, the pipette 204 can have a sharpened or narrowed distal end 206 that includes the circular and/or blunt distal tip 206a. In other embodiments, the distal tip 206a can be non-circular, or non-straight (e.g., curved). In a further embodiment shown in FIG. 9U, the distal tip 206a may be beveled or sharp.

Various embodiments of pipettes 204 in accordance with the present technology allow for precise volumetric measuring of reagent and/or other fluids by the reagent pipette assembly 175, without introducing cross-contamination between individual reagent containers 211 and/or reservoir wells 180. Further aspects of the pipette 204 can diminish reagent evaporation from the reagent containers 211 as well as limit or prevent the pipette from accumulating or clogging with debris or particles within the lumen 203 of the pipette 204. In one embodiment, the pipette 204 may be sized to have a 200 μL capacity. In other embodiments, the pipette 204 may be sized to have a capacity in a range of about 150 μL to about 450 μL.

In various embodiments, the reagent containers 211 can include a cap 219 (shown in FIGS. 9V-9Y) for inhibiting or limiting evaporation of reagent 227 stored within the containers 211 in the filling station 209 and during reagent removal by pipette 204. The cap 219 can be configured to engage and/or otherwise seal the upper opening 223 of the individual containers 211 (FIG. 9W). In one embodiment, the cap 219 is a threaded cap for mating with corresponding threads (not shown) on the upper opening 223 of the container 211. In other embodiments, the cap 219 can be a pressure-fit cap. FIG. 9V illustrates a cap 219 with an integrated access valve portion 225 configured to receive the distal end 206 of the pipette 204 (shown in FIG. 9J) in accordance with an embodiment of the present technology. In one embodiment, the access valve portion 225 is integral with the cap 219. In other embodiments, the access valve portion 225 can be coupled to the cap 219. For example, the access valve portion 225 can be coupled to the cap 219 with a ring 229 that is clamped, welded (e.g., sonic welded), or otherwise coupled with adhesive or other mechanical means known to those of ordinary skill in the art (FIG. 9V).

As shown in FIGS. 9V-9Y, the access valve portion 225 can be dome-shaped or otherwise rounded at a point of entry for the distal end 206 of the pipette (FIG. 9Y). The access valve portion 225 can be formed from a variety of materials suitable in the art for sealing and preventing evaporation of the reagent 227 and which may be impervious against immunohistochemistry and in situ hybridization reagents contained in the reagent containers 211. For example, the cap 219 and/or the access valve portion 225 may contain rubber material, such as ethylene propylene diene monomer (EPDM) rubber. In some embodiments, the cap 219 and/or the access valve portion 225 can have a durometer measurement of about 70, or in other embodiments a durometer measurement of about 55 to about 80. An opening 234 in the access valve portion 225 can provide access to the contents of the containers 211 by the pipette 204 (FIGS. 9X and 9Y). In one embodiment, the opening 234 can be a slit configured to squeegee ancillary liquids clinging to an outside surface of the distal end 206 of the pipette 204 during pipette removal to prevent reagent loss (FIG. 9X).

As illustrated in FIG. 9X, the cap 219 can include a protective seal 236 (e.g., a polyethylene film) that initially covers the cap 219, the access valve portion 225 and/or the opening 234 prior to piercing by the pipette 204. The protective seal 236 can prevent leaks or evaporation of reagent material during transport, storage etc. of the containers 211 prior to use in the system 100 (FIG. 1).

FIG. 9B shows the reagent pipette assembly 175 after the reagent pipette 204 has been filled with reagent. The pipette 204 is positioned to deliver the reagent into the reservoir well 180 identified in FIG. 9B. The pressurization device 221 can provide positive pressure to dispense the reagent. The reagent pipette assembly 175 can obtain additional reagent from the filling station 209 and dispense it into the same reservoir well 180 to produce a reagent mixture.

Referring to FIGS. 9B and 9C, to dispense a reagent mixture held by the carousel 177, the reagent pipette 204 can be inserted into the reagent well 180 and filled with a desired volume of the reagent mixture. FIG. 9C shows the loaded reagent pipette 204 dispensing the reagent mixture onto a microscope slide 156 at a processing station 245. The reagent pipette assembly 175 can repeatedly obtain reagent from the mixing station 165 and dispense the reagent onto the slide 156 or other slides at other processing stations.

FIGS. 9C and 9D illustrate stages of a washing process performed by the wash pipette assembly 176. Generally, the reservoir wells 180 can be washed by, for example, dispensing wash liquid so as to flood the reservoir wells 180 and removing (e.g., sucking out) wash liquid, as well as any residual reagent, left in the reservoir wells 180. The wash pipette assembly 176 can include a vacuum source 237 and a pressurization device 239 connected to a wash head assembly 241 by lines 247, 249, respectively. The drive assembly 184 can rotate the carousel 177 to position the reservoir well 180 at a wash position under the wash pipette 233.

FIG. 9D shows the wash pipette 233 after it has been lowered into one of the reservoir wells. Wash liquid can be delivered through the wash pipette 213 to dilute reagent, if any, in the reservoir well, flush the reservoir well, and/or otherwise rinse or wash the reservoir well. In some embodiments, the vacuum source 237 can be activated and the wash pipette 213 can suck out most or substantially all of the reagent in the reservoir well 180. The reservoir well 180 can then be flooded with wash liquid that flows (indicated by arrows) in a controlled manner to the drain 183. The flooding process can remove most or substantially all of the volume of residual reagent within the reservoir well 180. After flushing the reservoir well 180, the vacuum source 237 can be activated again to clear the reservoir well. In other embodiments, prior to aspirating, the reservoir well can be flooded with wash liquid that flows (indicated by arrows) in a controlled manner to the drain 183. The flooding process can remove most or substantially all of the volume of reagent within the reservoir well. After flushing the reservoir well, the vacuum source 237 can be activated and the wash pipette 213 can suck out most or substantially all of the liquid (e.g., wash liquid, a mixture of wash liquid and reagent, etc.) left in the reservoir well 180. The pipette 213 can then be raised, and the drive mechanism 184 can rotate the carousel 177 to position another reservoir well at the wash position (e.g., underneath the wash pipette 213). The pipette cleaner 251 (FIG. 9A) can periodically clean the outside of pipette 213. In other embodiments, two or more pipettes can be used in the wash process. For example, one wash pipette can be used to dispense wash liquid and another wash pipette can suck residual liquid from the reservoir wells. In yet other embodiments, the reagent pipette assembly 175 can be used to perform wash cycles by rinsing out the reservoir wells 180.

The controller 144 of FIG. 9D can be configured to command the drive mechanism 184 to sequentially move each of the reservoir wells 180 to the washing position for washing by the wash pipette assembly 176. In some embodiments, the controller 144 stores instructions in memory 147 (illustrated in phantom line) and executes the instructions to command the pipette apparatus 172 to sequentially fill the reservoir wells 180 with reagent from the containers 211. Additionally or alternatively, memory 147 can store mixing instructions (e.g., a mixing program) that are executable by the controller 144 to command the reagent pipette assembly 176 to deliver at least two reagents (e.g., two reagents, three reagents, etc.) to one of the reservoir wells. The mixing instructions can be selected based on information obtained from the slide to be processed. The controller 144 can be communicatively coupled to any or all of the components of the pipette apparatus 172.

The system 100 of FIGS. 1 and 2 can include one or more pipette apparatuses 172 discussed in connection with FIGS. 3-9D. The system 100 can have mixing stations 165 at opposite sides of the internal environment 121 (FIG. 2). The wash pipette assemblies can be stationary with vertically movable wash pipettes to avoid collisions between the wash pipettes and the reagent pipettes, which can be moved about the mixing stations. The mixing stations 165 can be serviced by a single reagent pipette assembly and a single wash pipette assembly. In other embodiments, each mixing station 165 is served by respective reagent pipette assemblies and wash pipette assemblies. The number of mixing stations, positions of the mixing stations, and sequence of operation of the reagent pipette assembly and wash pipette assembly can be selected based on the processes to be performed.

Figure 10:
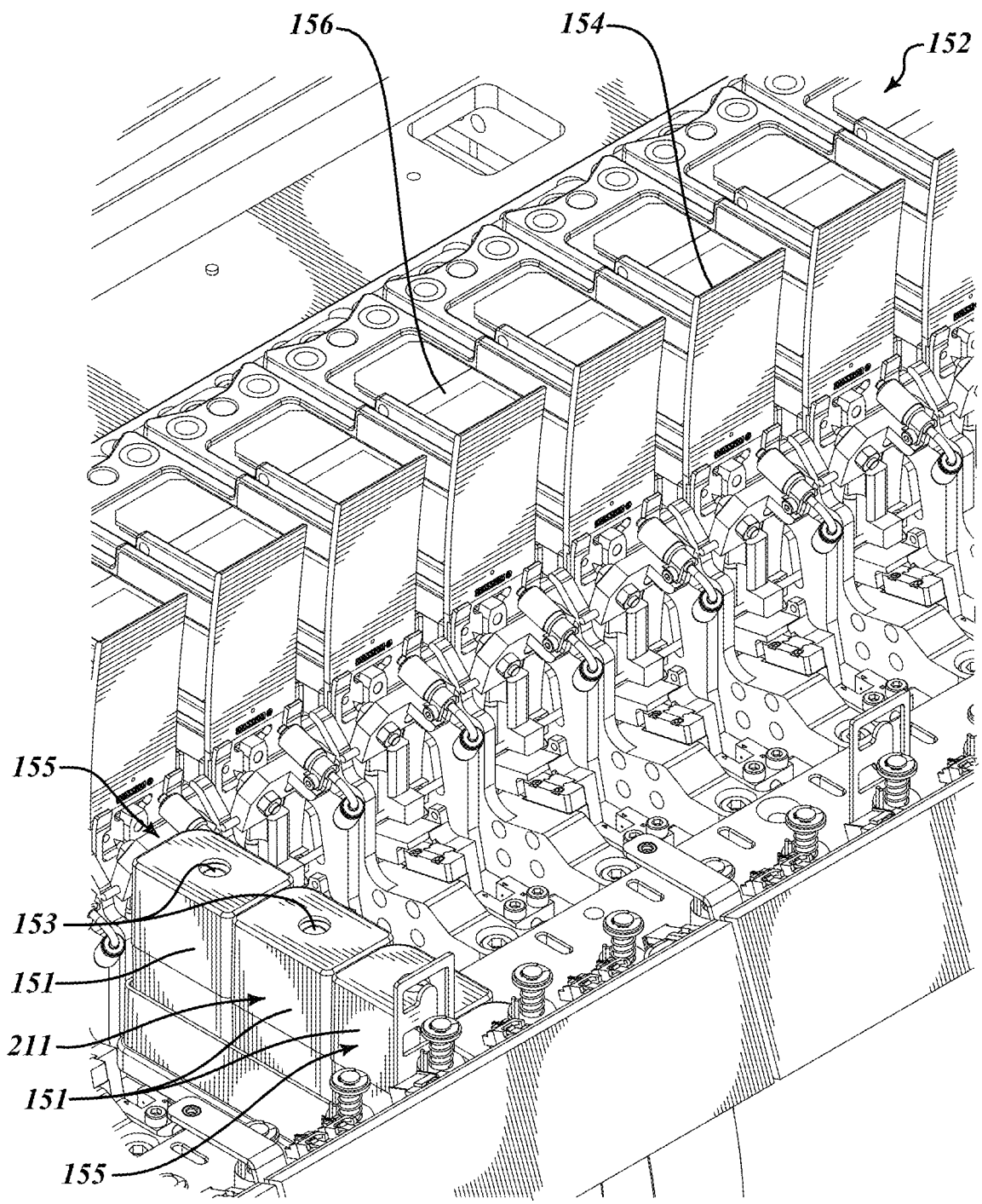
FIG. 10 is a detailed view of a portion of the specimen processing system of FIG. 2.

FIG. 10 is a detailed view of a section of the row 152. An opposable element 154 ("opposable 154") can move substance along a slide 156 to contact a specimen on the slide 156. In some embodiments, including the illustrated embodiment, 20 slides can be processed independently using a series of substances.

If a specimen is a biological sample embedded in paraffin, the sample can be deparaffinized using appropriate deparaffinizing fluid(s). After removing the deparaffinizing fluid(s), any number of substances can be successively applied to the specimen using the opposable 154. Fluids can also be applied for pretreatment (e.g., protein-crosslinking, exposing nucleic acids, etc.), denaturation, hybridization, washing (e.g., stringency washing), detection (e.g., linking a visual or marker molecule to a probe), amplifying (e.g., amplifying proteins, genes, etc.), counterstaining, or the like. In various embodiments, the substances include, without limitation, stains (e.g., hematoxylin solutions, eosin solutions, or the like), wetting agents, probes, antibodies (e.g., monoclonal antibodies, polyclonal antibodies, etc.), antigen recovering fluids (e.g., aqueous- or non-aqueous-based antigen retrieval solutions, antigen recovering buffers, etc.), solvents (e.g., alcohol, limonene, or the like), or the like. Stains include, without limitation, dyes, hematoxylin stains, eosin stains, conjugates of antibodies or nucleic acids with detectable labels such as haptens, enzymes or fluorescent moieties, or other types of substances for imparting color and/or for enhancing contrast. In some embodiments, the applied substance is a liquid reagent applied via dispensers, such as pipette dispensers 160, 162 depicted in FIG. 2 or reagent pipette assembly 175 depicted in FIGS. 3-9D.

A biological specimen can include one or more biological samples. Biological samples can be a tissue sample or samples (e.g., any collection of cells) removed from a subject. The tissue sample can be a collection of interconnected cells that perform a similar function within an organism. A biological sample can also be any solid or fluid sample obtained from, excreted by, or secreted by any living organism, including, without limitation, single-celled organisms, such as bacteria, yeast, protozoans, and amebas, multicellular organisms (such as plants or animals, including samples from a healthy or apparently healthy human subject or a human patient affected by a condition or disease to be diagnosed or investigated, such as cancer). In some embodiments, a biological sample is mountable on a microscope slide and includes, without limitation, a section of tissue, an organ, a tumor section, a smear, a frozen section, a cytology prep, or cell lines. An incisional biopsy, a core biopsy, an excisional biopsy, a needle aspiration biopsy, a core needle biopsy, a stereotactic biopsy, an open biopsy, or a surgical biopsy can be used to obtain the sample.

FIG. 10 shows a rack carrying a set of sealed containers 211 each holding about 10 mL to about 30 mL of reagent. The sealed containers 211 have caps 151 with seal elements in the form of septums 153 that can minimize, limit, or substantially prevent evaporation losses. The septums 153 can be broken (e.g., pierced, torn, etc.) to access the contents of the containers 211. When the user installs the containers 211, septums 153 can be broken to establish fluid communication with a pump or pipette (e.g., the reagent pipette 204 of FIGS. 9A-9D), which in turn delivers the fluid to an appropriate specimen processing station. The containers 211 can include, without limitation, one or more human readable labels, machine readable labels (e.g., a barcode to be read by the system 100), or other types of labels. The parking station 140, in some embodiments, provides fluids and solutions that are used in smaller volumes (e.g., dye solutions, such as hematoxylin and eosin solutions).

The slides disclosed herein can be a 1 inch×3 inch microscope slide, a 25 mm×75 mm microscope slide, or another type of flat or substantially flat substrate. "Substantially flat substrate" refers, without limitation, to any object having at least one substantially flat surface, but more typically to any object having two substantially flat surfaces on opposite sides of the object, and even more typically to any object having opposed substantially flat surfaces, which opposed surfaces are generally equal in size but larger than any other surfaces on the object. In some embodiments, the substantially flat substrate can comprise any suitable material, including plastics, rubber, ceramics, glass, silicon, semiconductor materials, metals, combinations thereof, or the like. Non-limiting examples of substantially flat substrates include flat covers, SELDI and MALDI chips, silicon wafers, or other generally planar objects with at least one substantially flat surface.

From the foregoing, it will be appreciated that specific embodiments of the invention have been described herein for purposes of illustration, but well-known structures and functions have not been shown or described in detail to avoid unnecessarily obscuring the description of at least some embodiments of the invention. The systems described herein can perform a wide range of processes for preparing biological specimens for analyzing. Where the context permits, singular or plural terms may also include the plural or singular term, respectively. Unless the word "or" is associated with an express clause indicating that the word should be limited to mean only a single item exclusive from the other items in reference to a list of two or more items, then the use of "or" in such a list shall be interpreted as including (a) any single item in the list, (b) all of the items in the list, or (c) any combination of the items in the list. The singular forms "a," "an," and "the" include plural referents unless the context clearly indicates otherwise. Thus, for example, reference to "a specimen" refers to one or more specimens, such as two or more specimens, three or more specimens, or four or more specimens.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An automated slide processing apparatus for dispensing liquids onto one or more microscope slides, the automated slide processing apparatus comprising:
a reagent pipette assembly including a reagent pipette having a proximal end configured to couple with a body of the reagent pipette assembly and a distal end portion opposite the proximal end, the reagent pipette movable between at least one loading position for obtaining reagent from a reagent container at a filling station and at least one dispense position, wherein the reagent container includes a cap having a dome-shaped access valve portion configured to be penetrated by a distal tip of the reagent pipette when in the loading position; and
a retainer configured to releasably secure the reagent pipette, wherein the retainer includes a rotation inhibitor that engages a non-circular outwardly facing surface portion positioned at the distal end portion of the reagent pipette to circumferentially orient the reagent pipette with respect to the retainer when the reagent pipette is inserted into the retainer and to inhibit rotation of the reagent pipette with respect to the retainer when the retainer secures the reagent pipette, and wherein the rotation inhibitor disengages the reagent pipette when the reagent pipette is removed from the retainer.

2. The automated slide processing apparatus of claim 1, wherein the reagent pipette is generally straight and includes a blunt distal tip.

3. The automated slide processing apparatus of claim 1, wherein the reagent pipette includes a sharpened distal tip.

4. The automated slide processing apparatus of claim 1, wherein the reagent pipette includes a beveled distal tip.

5. The automated slide processing apparatus of claim 1, further comprising a locking mechanism for moving the retainer between an open configuration and a closed configuration, for receiving and securing the reagent pipette within the retainer.

6. The automated processing apparatus of claim 5, wherein the locking mechanism includes a lever positioned clamp.

7. The automated processing apparatus of claim 5, wherein the locking mechanism includes a sliding clamp.

8. The automated processing apparatus of claim 5, wherein the locking mechanism includes a bayonet mount.

9. The automated processing apparatus of claim 5, wherein the locking mechanism includes a first plate, and a second plate configured to engage and lock with the first plate when the retainer is in the closed configuration.

10. The automated processing apparatus of claim 5, wherein the locking mechanism includes a hollow threaded screw.

11. The automated slide processing apparatus of claim 1, wherein the non-circular portion is a flat surface facing radially outwardly with respect to the reagent pipette, and wherein the rotation inhibitor includes an orienting pin to align the pipette within the retainer by engaging the flat surface.

12. The automated processing apparatus of claim 11, wherein the proximal end of the pipette is coupled to a fluid port for providing fluid flow to the pipette, wherein the fluid flow to the pipette includes a vacuum and/or pressurized air, and wherein the fluid flow is a wash flow for cleaning the pipette following dispensing reagent at the at least one dispense position.

13. The automated processing apparatus of claim 11, wherein the flat surface is formed axially along a chord of a circular surface portion of the reagent pipette.

14. The automated processing apparatus of claim 1, further comprising a controller communicatively coupled to the reagent pipette assembly and configured to command a drive mechanism such that the drive mechanism moves the reagent pipette assembly from the loading position to the dispense position.

15. The automated slide processing apparatus of claim 1, wherein the access valve portion includes an opening and a protective seal over the opening prior to penetration.

16. A method of replacing a pipette, having a distal end for dispensing, in an automated slide processing apparatus, the method comprising:
moving a locking mechanism from a closed configuration to an open configuration to release a first pipette from a pipette retainer of a reagent pipette assembly, wherein the locking mechanism is carried by a carriage assembly of the reagent pipette assembly;
removing the first pipette from a shaft of the pipette retainer;
sliding a second pipette into the shaft of the pipette retainer, thereby engaging a rotation inhibitor of the pipette retainer against a non-circular outwardly facing surface portion positioned at a distal end portion of the second pipette to circumferentially orient the second pipette with respect to the pipette retainer as the second pipette slides into the retainer, wherein the distal end portion is opposite a proximal end of the second pipette, wherein the proximal end portion is configured to couple with a body of the reagent pipette assembly; and moving the locking mechanism to the closed configuration to retain the second pipette in the shaft of the pipette retainer, wherein the engagement of the rotation inhibitor against the non-circular surface portion of the second pipette inhibits rotation of the second pipette with respect to the pipette retainer.

17. The method of claim 16, wherein releasing the locking mechanism includes lifting a central lever, and wherein engaging the locking mechanism includes lowering the central lever.

18. The method of claim 16, wherein the non-circular surface portion includes a flat surface facing radially outwardly with respect to the second pipette.

19. The method of claim 16, wherein before the locking mechanism is moved to the closed configuration to retain the second pipette in the shaft of the pipette retainer, the method comprises:
inserting the distal end portion of the second pipette into the shaft of the pipette retainer; and
moving the distal end portion of the second pipette axially along the shaft of the pipette retainer.

20. The method of claim 16, further comprising moving the reagent pipette assembly to penetrate a dome-shaped access valve of a reagent container cap with a distal tip of the first pipette.

21. An automated slide processing apparatus configured to dispense liquids, from a proximal end of a first reagent pipette, onto one or more microscope slides, the automated slide processing apparatus comprising:
a reagent pipette assembly movable between at least one loading position for obtaining reagent from a reagent container and at least one dispense position; and a retainer movable from a first configuration for securing the first reagent pipette to the reagent pipette assembly and a second configuration for releasing the first reagent pipette, the first reagent pipette having a proximal end configured to couple with a body of the reagent pipette assembly and a distal end portion opposite the proximal end, wherein the retainer includes a rotation inhibitor that engages a flat radially outwardly facing external surface portion positioned at the distal end portion of the first reagent pipette to circumferentially orient the first regent pipette within the retainer when the retainer is in the first configuration, wherein the rotation inhibitor is positioned to (1) allow the first reagent pipette to be removed from the retainer in the second configuration, and (2) contact a flat radially outwardly facing external surface portion positioned at a distal end portion of a second reagent pipette that replaces the first reagent pipette to circumferentially orient the second regent pipette within the retainer.

22. The automated slide processing apparatus of claim 21, further comprising a reagent container with a dome-shaped access valve configured to be penetrated by a distal tip of the first reagent pipette when the automated slide processing apparatus moves the first reagent pipette one of the loading positions.

* * * * *